US010812201B2

(12) United States Patent
Lizotte et al.

(10) Patent No.: US 10,812,201 B2
(45) Date of Patent: *Oct. 20, 2020

(54) INFORMATION TRANSFER USING DISCRETE-FREQUENCY SIGNALS AND INSTANTANEOUS FREQUENCY MEASUREMENT

(71) Applicant: Astronics AeroSat, Manchester, NH (US)

(72) Inventors: Richard P. Lizotte, Hudson, NH (US); Jonathan E. Epstein, Acton, MA (US); John M. Wilson, Hanover, NH (US)

(73) Assignee: Astronics AeroSat, Manchester, NH (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/226,412

(22) Filed: Dec. 19, 2018

(65) Prior Publication Data

US 2019/0123837 A1    Apr. 25, 2019

Related U.S. Application Data

(63) Continuation of application No. 16/126,361, filed on Sep. 10, 2018.

(Continued)

(51) Int. Cl.
*H04B 10/524* (2013.01)
*H04B 7/01* (2006.01)
(Continued)

(52) U.S. Cl.
CPC .............. *H04B 17/21* (2015.01); *H04B 7/01* (2013.01); *H04B 10/508* (2013.01);
(Continued)

(58) Field of Classification Search
CPC . H04W 72/0406; H04W 88/02; H04W 64/00; H04L 27/2602; H04L 5/0007
See application file for complete search history.

(56) References Cited

U.S. PATENT DOCUMENTS

2005/0024038 A1    2/2005  Santhoff
2012/0213305 A1*   8/2012  Oh ................. H04L 1/0083
                                                   375/267

(Continued)

FOREIGN PATENT DOCUMENTS

EP          1646195 A1    4/2006

OTHER PUBLICATIONS

Astronics Aerosat, International Search Report and Written Opinion, PCT/US2018/050396, dated Dec. 14, 2018, 9 pgs.

(Continued)

*Primary Examiner* — Iqbal Zaidi
(74) *Attorney, Agent, or Firm* — Morgan, Lewis & Bockius LLP

(57) ABSTRACT

A method of receiving information is provided. The method, performed at a system for information transfer, includes receiving a signal pulse and determining a frequency band and a pulse duration associated with the signal pulse. The method includes, in accordance with a determination that the frequency band is one of a set of frequency bands, determining, from a first set of symbols, a first symbol associated with the frequency band. The method also includes, in accordance with a determination that the pulse duration is one of a set of pulse durations, determining, from a distinct second set of symbols, a second symbol associated with the pulse duration. Each frequency band in the set of frequency bands is associated with a respective symbol in the first set (Continued)

of symbols, and each pulse duration in the set of pulse durations is associated with a respective symbol in the second set of symbols.

20 Claims, 11 Drawing Sheets

Related U.S. Application Data

(60) Provisional application No. 62/557,418, filed on Sep. 12, 2017.

(51) Int. Cl.
*H04W 24/10* (2009.01)
*H04W 72/04* (2009.01)
*H04B 17/21* (2015.01)
*H04J 14/02* (2006.01)
*H04B 10/508* (2013.01)

(52) U.S. Cl.
CPC ........ *H04B 10/524* (2013.01); *H04J 14/0227* (2013.01); *H04W 24/10* (2013.01); *H04W 72/0453* (2013.01)

(56) References Cited

U.S. PATENT DOCUMENTS

2015/0372843 A1* 12/2015 Bala .................. H04L 25/03834
375/295
2018/0184378 A1* 6/2018 Fang ................. H04W 52/0235

OTHER PUBLICATIONS

Lizotte, Office Action, U.S. Appl. No. 16/126,361, dated Nov. 1, 2019, 17 pgs.

Lizotte, Notice of Allowance, U.S. Appl. No. 16/126,361, dated Feb. 27, 2020, 8 pgs.

Lizotte, Office Action, U.S. Appl. No. 16/226,364, dated Mar. 5, 2020, 25 pgs.

Lizotte, Notice of Allowance, U.S. Appl. No. 16/226,364, dated Jun. 12, 2020, 8 pgs.

\* cited by examiner

| Lookup Table 104 | | |
| --- | --- | --- |
| Symbol Data | Symbol | Frequency (MHz) |
| 0000 | 0 | 10.231 |
| 0001 | 1 | 10.294 |
| 0010 | 2 | 10.356 |
| 0011 | 3 | 10.481 |
| 0100 | 4 | 10.544 |
| 0101 | 5 | 10.606 |
| ⋮ | ⋮ | ⋮ |
| $S_{N-1}$ | N-1 | $f_{N-1}$ |

Figure 3A

| Lookup Table 124 | | |
| --- | --- | --- |
| Frequency (MHz) | Symbol | Symbol Data |
| 10.231 | 0 | 0000 |
| 10.294 | 1 | 0001 |
| 10.356 | 2 | 0010 |
| 10.481 | 3 | 0011 |
| 10.544 | 4 | 0100 |
| 10.606 | 5 | 0101 |
| ⋮ | ⋮ | ⋮ |
| $f_{N-1}$ | N-1 | $S_{N-1}$ |

Figure 3B

INFORMATION TRANSFER USING DISCRETE-FREQUENCY SIGNALS AND INSTANTANEOUS FREQUENCY MEASUREMENT

RELATED APPLICATION

This application is a continuation of U.S. application Ser. No. 16/126,361, filed Sep. 10, 2018, entitled "Information Transfer Using Discrete-Frequency Signals and Instantaneous Frequency Measurement," which claims priority to U.S. Provisional Application Ser. No. 62/557,418, filed Sep. 12, 2017, entitled "Information Transfer Using Discrete-Frequency Continuous Waves and Instantaneous Frequency Measurement," both of which are incorporated by reference herein in their entireties.

TECHNICAL FIELD

This relates generally to information transfer through modulation of electronic signals, including but not limited to discrete-frequency signals and instantaneous frequency measurement of signals.

BACKGROUND

The transfer of information between devices is widely achieved through the modulation and transmission of electronic signals, for example by a transmitter, and the receipt and demodulation of the transmitted electronic signals, for example, by a receiver. Conventional techniques for modulation of electronic signals are cumbersome, inefficient, and limited. In some cases, conventional modulation methods are constrained by limited signal-to-noise ratios of transmitted signals, often due to limits on transmission power levels due to transmitter design or to regulatory limits. In some cases, conventional modulation methods require wide bands of frequency spectrum, which are limited and can be difficult to obtain. In some cases, because receivers have limited ability to accurately determine the frequency of a received signal, wider frequency bands are used for each unit of information, which reduces the information transmission rate obtainable per unit of a particular band of frequency spectrum.

SUMMARY

Accordingly, there is a need for methods of information transfer, and systems and devices for carrying out such methods, that better utilize available frequency spectrum, improve receiver accuracy, and achieve higher rates of information transmission per unit of available frequency spectrum.

The above deficiencies and other problems associated with conventional information transfer approaches are reduced or eliminated by the disclosed methods, devices, and systems. In accordance with some embodiments, a method of receiving information includes receiving a first signal pulse and determining a first frequency band associated with the first signal pulse. The method includes, in accordance with a determination that the first frequency band is a respective frequency band in a first predefined set of frequency bands, determining, from a predefined set of symbols, a first symbol associated with the first frequency band and represented by the first signal pulse, and providing the first symbol. In some embodiments, each frequency band in the first predefined set of frequency bands is associated with a distinct respective symbol in the predefined set of symbols. In some embodiments, frequency bands in the first predefined set of frequency bands, in aggregate, are not contiguous.

In some embodiments, the method further includes, after at least a predefined amount of time since receiving the first signal pulse, receiving a second signal pulse and determining a second frequency band associated with the second signal pulse. In some embodiments, the method further includes, in accordance with a determination that the second frequency band is a respective frequency band in the first predefined set of frequency bands, determining, from the predefined set of symbols, a second symbol associated with the second frequency band and represented by the second signal pulse and providing the second symbol.

In some embodiments, the first predefined set of frequency bands are associated with the predefined set of symbols using a lookup table. In some embodiments, determining the first symbol associated with the first frequency band includes selecting the respective symbol associated with the first frequency band in the lookup table.

In some embodiments, a duration of the first signal pulse is less than a predetermined duration.

In some embodiments, a length of the first signal pulse is less than one full wavelength. In some embodiments, determining the first frequency band associated with the first signal pulse includes determining a phase of the first signal pulse at a respective time, determining a first frequency of the first signal pulse based on the determined phase of the first signal pulse at the respective time and on a rate of change with respect to time of the first signal pulse at the respective time, and determining that the first frequency of the first signal pulse is in the first frequency band.

In some embodiments, the predefined set of symbols includes two or more symbols associated with the first frequency band, each symbol of the two or more symbols associated with a respective pulse duration. In some embodiments, the method further includes determining a first pulse duration of the first signal pulse. In some embodiments, determining the first symbol includes selecting the first symbol from the two or more symbols associated with the first frequency band based on the first pulse duration.

In some embodiments, the first signal pulse is received at a plurality of input channels of a receiver, each input channel associated with a respective frequency band in the first predefined set of frequency bands. In some embodiments, determining the first frequency band associated with the first signal pulse includes measuring channel power of each respective input channel, and identifying a respective input channel having a highest measured channel power.

In some embodiments, determining the first frequency band associated with the first signal pulse includes receiving the first signal pulse at a first frequency detection stage and determining, using the first frequency detection stage, a first frequency range that includes the first frequency of the first signal pulse. In some embodiments, the method further includes, after determining the first frequency range, receiving the first signal pulse at a second frequency detection stage and determining, within the first frequency range, using the second frequency detection stage, a second frequency range that includes the first frequency of the first signal pulse. In some embodiments, the second frequency range is smaller than the first frequency range and the first frequency band corresponds to the second frequency range.

In some embodiments, the method further includes, before receiving the first signal pulse, obtaining a third signal pulse, determining a third frequency of the third signal pulse, and comparing the third frequency to a predefined calibration frequency to determine a difference between the third frequency and the predefined calibration frequency. In some embodiments, determining the first frequency band of the first signal pulse includes determining an initial frequency of the first signal pulse, determining an adjusted frequency of the first signal pulse based on applying the determined difference to the initial frequency, and determining the first frequency band based on the adjusted frequency.

In some embodiments, the first predefined set of frequency bands includes a first respective frequency band and a second respective frequency band that is a nearest frequency band in the first predefined set of frequency bands to the first respective frequency band. In some embodiments, the first respective frequency band has a first center frequency and the second respective frequency band has a second center frequency. In some embodiments, a difference between the first center frequency and the second center frequency exceeds a predefined frequency difference threshold.

In some embodiments, the method further includes, after receiving the first signal pulse, receiving a control signal associating a second predefined set of frequency bands with the predefined set of symbols. In some embodiments, the second predefined set of frequency bands is distinct from the first predefined set of frequency bands. In some embodiments, each frequency band in the second predefined set of frequency bands is associated with a distinct respective symbol in the predefined set of symbols. In some embodiments, frequency bands in the second predefined set of frequency bands, in aggregate, are not contiguous. In some embodiments, the method further includes, after receiving the control signal, receiving a fourth signal pulse, and determining a third frequency band associated with the fourth signal pulse. In some embodiments, the method includes, in accordance with a determination that the third frequency band is a respective frequency band in the second predefined set of frequency bands, determining, from the predefined set of symbols, a third symbol associated with the third frequency band and represented by the fourth signal pulse, and providing the third symbol.

In accordance with some embodiments, a method of receiving information includes receiving a first signal pulse, determining a first frequency band associated with the first signal pulse, and determining a first pulse duration of the first signal pulse. The method includes, in accordance with a determination that the first frequency band is a respective frequency band in a first predefined set of frequency bands, and in accordance with a determination that the first pulse duration is a respective pulse duration in a first predefined set of pulse durations, determining, from a predefined set of symbols, a first symbol associated with the first frequency band and with the first pulse duration, and represented by the first signal pulse. The method also includes providing the first symbol. In some embodiments, each frequency band in the first predefined set of frequency bands is associated with two or more distinct symbols in the predefined set of symbols. In some embodiments, each of the two or more distinct symbols associated with a respective frequency band is associated with a distinct respective pulse duration in the first predefined set of pulse durations.

In accordance with some embodiments, a system for information transfer includes a receiver configured to receive a first signal pulse. The system further includes processing circuitry configured to receive a first signal pulse and determine a first frequency band associated with the first signal pulse. In accordance with a determination that the first frequency band is a respective frequency band in a first predefined set of frequency bands, the processing circuitry is configured to determine, from a predefined set of symbols, a first symbol associated with the first frequency band and represented by the first signal pulse, and to provide the first symbol. In some embodiments, each frequency band in the first predefined set of frequency bands is associated with a distinct respective symbol in the predefined set of symbols. In some embodiments, frequency bands in the first predefined set of frequency bands, in aggregate, are not contiguous. In some embodiments, the system for information transfer is configured to perform any of the methods for receiving information, as described herein.

In accordance with some embodiments, a method of transmitting information includes obtaining a first symbol, in a predefined set of symbols, for transmission. The method further includes determining a first frequency band, in a first predefined set of frequency bands, associated with the first symbol, and transmitting a first signal pulse having a first frequency in the first frequency band. In some embodiments, each frequency band in the first predefined set of frequency bands is associated with a distinct respective symbol in the predefined set of symbols. In some embodiments, frequency bands in the first predefined set of frequency bands, in aggregate, are not contiguous.

In some embodiments, the method further includes obtaining a second symbol, in the predefined set of symbols, for transmission, and determining a second frequency band, in the first predefined set of frequency bands, associated with the second symbol. In some embodiments, the method further includes, after at least a predefined amount of time since transmitting the first signal pulse, transmitting a second signal pulse having a second frequency in the second frequency band.

In some embodiments, the method includes, after transmitting the first signal pulse, transmitting a control signal associating a second predefined set of frequency bands with the predefined set of symbols. In some embodiments, the second predefined set of frequency bands is distinct from the first predefined set of frequency bands and each frequency band in the second predefined set of frequency bands is associated with a distinct respective symbol in the predefined set of symbols. In some embodiments, frequency bands in the second predefined set of frequency bands, in aggregate, are not contiguous. In some embodiments, the method further includes, after transmitting the control signal, obtaining a third symbol, in the predefined set of symbols, for transmission and determining a third frequency band, in the second predefined set of frequency bands, associated with the third symbol. In some embodiments, the method further includes transmitting a third signal pulse having a third frequency in the third frequency band.

In some embodiments, the method further includes, prior to transmitting the control signal associating the second predefined set of frequency bands with the predefined set of symbols, determining that a spectral density of a respective frequency band in the first predefined set of frequency bands satisfies a predefined threshold value, and identifying, from the predefined set of symbols, a respective symbol that is associated with the respective frequency band in the first predefined set of frequency bands. In some embodiments, the method includes determining that a spectral density of a fourth frequency band, outside of the first predefined set of frequency bands, is below the predefined threshold value. In some embodiments, the second predefined set of frequency bands includes the fourth frequency band, and the respective symbol in the predefined set of symbols is associated with the fourth frequency band in the second predefined set of frequency bands.

In some embodiments, the first predefined set of frequency bands are associated with the predefined set of symbols using a lookup table. In some embodiments, determining the first frequency band associated with the first symbol includes selecting the respective frequency band associated with the first symbol in the lookup table.

In some embodiments, the predefined set of symbols includes two or more symbols associated with the first frequency band, each symbol of the two or more symbols associated with a respective pulse duration. In some embodiments, the method includes determining a first pulse duration based on the first symbol of the two or more symbols. In some embodiments, a pulse duration of the first signal pulse corresponds to the first pulse duration.

In some embodiments, the method further includes, before transmitting the first signal pulse, transmitting a plurality of successive pulses having one or more calibration frequencies.

In accordance with some embodiments, a method of transmitting information includes obtaining a first symbol, in a predefined set of symbols, for transmission. The method includes determining a first frequency band, in a first predefined set of frequency bands, associated with the first symbol. The method also includes determining a first pulse duration, in a first predefined set of pulse durations, associated with the first symbol. The method includes transmitting a first signal pulse having the first pulse duration and having a first frequency in the first frequency band. In some embodiments, each frequency band in the first predefined set of frequency bands is associated with two or more distinct symbols in the predefined set of symbols. In some embodiments, each of the two or more distinct symbols associated with a respective frequency band is associated with a distinct respective pulse duration in the first predefined set of pulse durations.

In accordance with some embodiments, a system for information transfer includes processing circuitry configured to obtain a first symbol, in a predefined set of symbols, for transmission, and determine a first frequency band, in a first predefined set of frequency bands, associated with the first symbol. The system further includes a transmitter, configured to transmit a first signal pulse having a first frequency in the first frequency band. In some embodiments, each frequency band in the first predefined set of frequency bands is associated with a distinct respective symbol in the predefined set of symbols. In some embodiments, frequency bands in the first predefined set of frequency bands, in aggregate, are not contiguous. In some embodiments, the system for information transfer is configured to perform any of the methods for transmitting information, as described herein.

BRIEF DESCRIPTION OF THE DRAWINGS

For a better understanding of the various described embodiments, reference should be made to the Detailed Description below, in conjunction with the following drawings.

FIGS. 3A-3B are block diagrams illustrating example lookup tables assigning frequencies to symbols and symbol data, in accordance with some embodiments.

Figure 1:
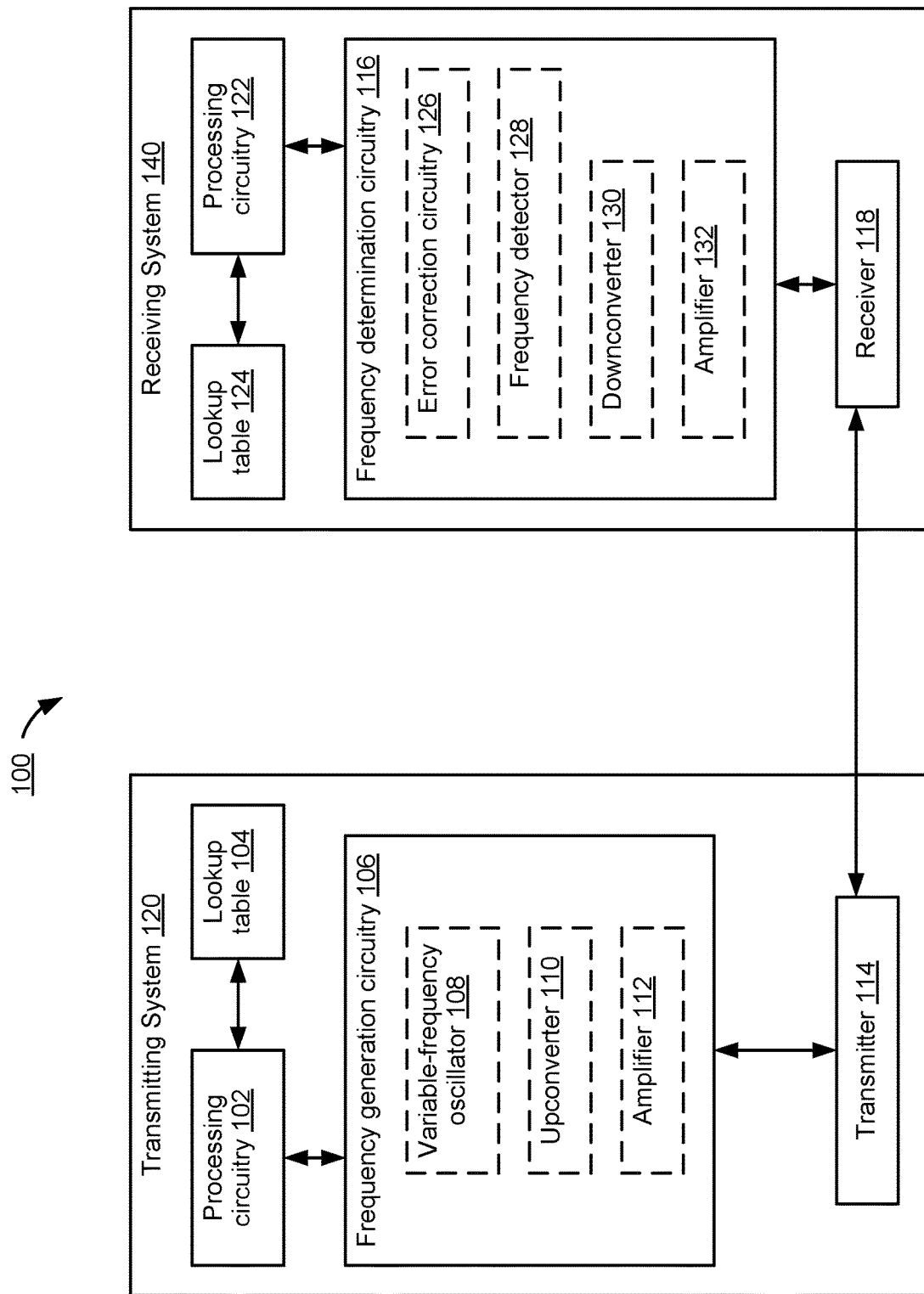
FIG. 1 is a block diagram illustrating an example implementation of a communications system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all the elements of a given system, method or device, or may depict relevant features or portions of an element without depicting the full extent of the element. Finally, like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms "first," "second," etc. may be used herein to describe various elements, these elements should not be limited by these terms. These terms are only used to distinguish one element from another. For example, a first signal could be termed a second signal, and, similarly, a second signal could be termed a first signal, without changing the meaning of the description, so long as all occurrences of the "first signal" are renamed consistently and all occurrences of the "second signal" are renamed consistently. The first signal and the second signal are both signals, but they are not the same signal, unless the context clearly indicates otherwise.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B and C" is to be construed to require one or more of the listed items, and this phrase reads on a single instance of A alone, a single instance of B alone, or a single instance of C alone, while also encompassing combinations of the listed items such as "one or more of A and one or more of B without any of C," and the like.

As used herein, the term "if" may be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

FIG. 1 is a block diagram illustrating an example implementation of communications system 100, in accordance with some embodiments. In some embodiments, communications system 100 is used to perform any of the methods described herein. While some example features are illustrated, various other features have not been illustrated for the sake of brevity and so as not to obscure pertinent aspects of the example embodiments disclosed herein. To that end, as a non-limiting example, communications system 100 includes a transmitting system 120 (sometimes called a transmitting device), which is used to transmit data (e.g., to a receiving system), and a receiving system 140 (sometimes called a receiving device), which is used to receive data (e.g., transmitted by a transmitting system).

In some embodiments, transmitting system 120 includes processing circuitry 102. In some embodiments, processing circuitry 102 is implemented using one or more processors (or processor cores) (e.g., CPUs, microprocessors, microcontrollers, digital signal processors (DSPs), or the like) configured to execute instructions in one or more programs (e.g., stored in processing circuitry 102, such as in one or more memory components of processing circuitry 102, or stored in memory separate from and communicatively coupled with processing circuitry 102) for performing operations described herein. In some embodiments, processing circuitry 102 is implemented using hardware circuitry such as one or more field-programmable gate arrays (FPGAs) or application-specific integrated circuits (ASICs) configured to perform operations described herein.

In some embodiments, transmitting system 120 includes lookup table 104. In some embodiments, lookup table 104 stores information associating symbols (which represent units of data) with frequencies representing the symbols, and, in some embodiments, associating units of data with the symbols representing the data (e.g., as described in further detail herein with reference to FIGS. 3A-3B). In some embodiments, processing circuitry 102 is communicatively coupled with lookup table 104. In some embodiments, lookup table is stored in a storage medium, such as non-volatile memory (e.g., solid-state memory, flash memory, that can be part of or separate from processing circuitry 102) or volatile memory (e.g., a cache of processing circuitry 102) in transmitting system 120. In some embodiments, processing circuitry 102 identifies data for transmission, and, using information from lookup table 104, identifies from the data one or more units of data for transmission (e.g., one or more groups of bits of data) corresponding to one or more predefined symbols. In some embodiments, processing circuitry 102 uses information obtained from lookup table 104 to determine respective frequencies at which to transmit respective signals representing the one or more symbols, each representing a unit of the data for transmission.

In some embodiments, transmitting system 120 includes frequency generation circuitry 106. In some embodiments, frequency generation circuitry 106 is used to generate respective signals at respective frequencies determined by processing circuitry 102, to represent one or more symbols representing data. To that end, in some embodiments, frequency generation circuitry 106 includes variable-frequency oscillator (VFO) 108, upconverter 110, and/or amplifier 112. In some embodiments, VFO 108 is used to generate signals (e.g., continuous wave signals or pulses) at respective frequencies. In some embodiments, VFO 108 generates sinusoidal signals. In some embodiments, VFO 108 generates square waves. In some embodiments, VFO 108 generates signals that have frequencies corresponding to the frequencies in lookup table 104 and are representative of symbols. In some embodiments, the signals generated by VFO 108 are optionally converted to higher frequencies for transmission using upconverter 110 (e.g., in situations where higher-frequency signal transmission is preferred over lower-frequency signal transmission). In some embodiments, amplifier 112 receives signals from frequency generation circuitry 106, optionally via upconverter 110, and amplifies the signals (e.g., the signal amplitude) prior to transmission.

In some embodiments, transmitting system 120 includes transmitter 114. In some embodiments, transmitter 114 is used to transmit signals that have been produced by frequency generation circuitry 106 (optionally in conjunction with upconverter 110 and/or amplifier 112) in accordance with respective frequencies determined by processing circuitry 102, and optionally amplified using amplifier 112. In some embodiments, transmitter 114 is, or includes, an antenna.

In some embodiments, one or more signals transmitted by transmitting system 120 (e.g., by transmitter 114), are received at receiving system 140. More specifically, in some embodiments, the one or more signals are received at receiver 118 of receiving system 140. In some embodiments, receiver 118 is, or includes, an antenna. In some embodiments, receiver 118 is communicatively coupled with frequency determination circuitry 116. In some embodiments, frequency determination circuitry 116 determines respective frequencies of one or more signals received by receiver 118 (e.g., from transmitting system 120).

In some embodiments, frequency determination circuitry 120 includes amplifier 132, downconverter 130, frequency detector 128, and/or error correction circuitry 126. In some embodiments, signals received by receiver 118 are amplified by amplifier 132 prior to determining the frequencies of the received signals. In some embodiments, such as those in which a transmitting system uses an upconverter, corresponding downconverter 130 is used to convert received signals to signals that have lower frequencies, which in turn are used for detection and decoding. In some embodiments, frequency detector 128 receives signals from receiver 118 (optionally via downconverter 130 and/or amplifier 132) and determines the frequencies of the received signals.

In some embodiments, error correction circuitry 126 receives detected frequencies from frequency detector 128 and determines a correction factor (e.g., an offset) corresponding to the determined frequencies. In some embodiments, error correction circuitry 126 is used to calibrate or recalibrate frequency detector 128. In some such embodiments, error correction circuitry 126 compares a detected frequency received from frequency detector 128 to a known, expected frequency, to determine a correction factor for the determined frequency. In some embodiments, error correction circuitry 126 is used to correct a detected frequency by applying a previously-determined correction factor to a detected frequency received from frequency detector 128.

In some embodiments, frequency determination circuitry 120 (e.g., frequency detector 128, optionally in conjunction with error correction circuitry 126) outputs frequencies that have been determined for received signals to processing circuitry 122 of receiving system 140. In some embodiments, processing circuitry 122 is implemented using one or more processors configured to execute instructions in one or more programs, or using hardware circuitry, as described above with reference to processing circuitry 102 of transmitting system 120.

In some embodiments, receiving system 140 includes lookup table 124. In some embodiments, lookup table 124 stores information associating symbols (which represent units of data) with frequencies representing the symbols, and, in some embodiments, associating units of data with the symbols representing the data (e.g., similar to lookup table 104 of transmitting system 120, and as described in further detail herein with reference to FIGS. 3A-3B. In some embodiments, processing circuitry 122 is communicatively coupled with lookup table 124. In some embodiments, lookup table is stored in a storage medium, such as non-volatile memory (e.g., solid-state memory, flash memory, that can be part of or separate from processing circuitry 122) or volatile memory (e.g., a cache of processing circuitry 122) in receiving system 140. In some embodiments, processing circuitry 122 uses information from lookup table 124 to determine respective symbols associated with respective frequencies received from frequency determination circuitry 120 (e.g., respective frequencies of signals received at receiver 118). In some embodiments, processing circuitry 122 uses information from lookup table 124 to identify one or more units of received data represented by the determined symbols. In some embodiments, processing circuitry 122 processes the one or more units of received data. In some embodiments, processing circuitry 122 aggregates (e.g., concatenates) multiple units of received data and processes the aggregated data.

Figure 2A:
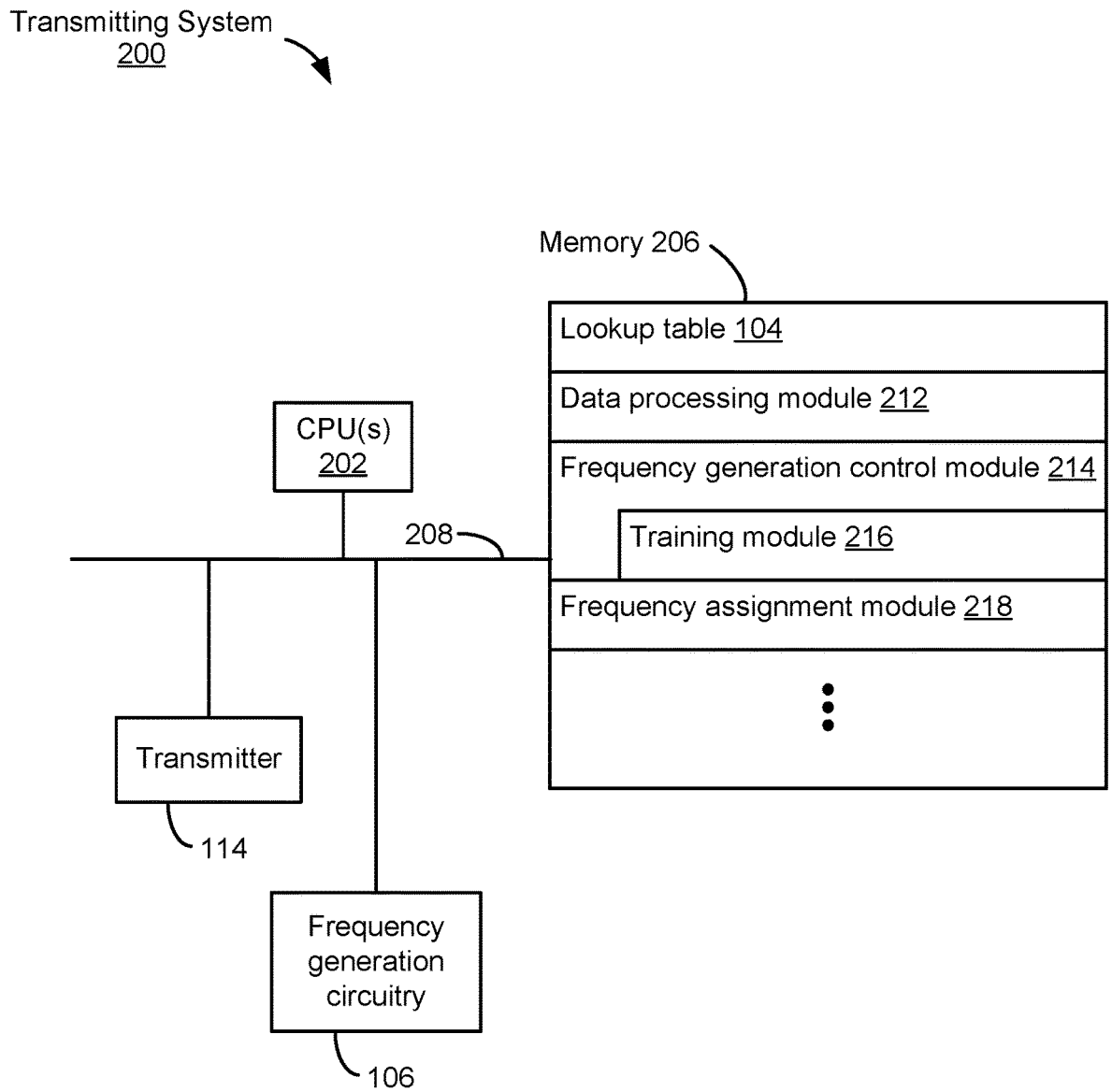
FIG. 2A is a block diagram illustrating an example implementation of a transmitting system, in accordance with some embodiments.

FIG. 2A is a block diagram illustrating an example implementation of a transmitting system 200, in accordance with some embodiments. In some embodiments, transmitting system 200 is used in communication system 100, FIG. 1 (e.g., in place of transmitting system 120) for transmitting signals representing data (e.g., information for transmission).

In some embodiments, transmitting system 200 includes one or more processing units 202 (e.g., sometimes called processors or CPUs, and implemented using processors or processing cores, as described above) for executing modules, programs and/or instructions stored in memory 206 for performing operations described herein; memory 206; and one or more communication buses 208 for interconnecting these components. Communication buses 208 optionally include circuitry (sometimes called a chipset) that interconnects and controls communications between system components. In some embodiments, transmitting system 200 includes transmitter 114 and frequency generation circuitry 106 (e.g., as described herein with reference to FIG. 1).

In some embodiments, memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processors 202. In some embodiments, memory 206, or the non-volatile memory device(s) within memory 206, includes a non-transitory computer readable storage medium. In some embodiments, memory 206, or the computer readable storage medium of memory 206, stores the following programs, modules, and data structures, or a subset or superset thereof:

lookup table 104, used for storing associations of units of data to symbols and frequencies (e.g., as described herein with reference to FIG. 1);

data processing module 212, used for identifying units of data from aggregated data, identifying symbols associated with the identified units of data, and identifying frequencies representing the identified symbols and identified units of data;

frequency generation control module 214, used for controlling generation of signals at identified frequencies (e.g., identified by data processing module 212) using frequency generation circuitry 106, optionally including:

training module 216, used for controlling generation of one or more calibration signals (sometimes called a "training sequence") for transmission to a receiving system and used to correct for or mitigate transmission errors between transmitting system 200 and the receiving system; and frequency assignment module 218, used for identifying frequencies and/or frequency bands that are available for transmission, and assigning units of data and symbols to a set of frequency bands (or to respective frequencies within the set of frequency bands), and, in some embodiments, reassigning units of data and symbols to different sets of frequency bands (or frequencies), and for updating lookup table 104 accordingly.

Each of the above identified elements may be stored in one or more of the previously mentioned memory devices that together form memory 206, and corresponds to one or more sets of instructions for performing a function described above. The above identified modules or programs (i.e., sets of instructions) need not be implemented as separate software programs, procedures, or modules, and thus various subsets of these modules may be combined or otherwise rearranged in various embodiments. In some embodiments, memory 206 may store a subset of the modules and data structures identified above. In some embodiments, memory 206 may store additional modules and data structures not described above. In some embodiments, the programs, modules, and data structures stored in memory 206, or the computer readable storage medium of memory 206, provide instructions for implementing respective operations in the methods described below with reference to FIGS. 5A-5C and 6A-6B.

Although FIG. 2A shows transmitting system 200, FIG. 2A is intended more as a functional description of the various features that may be present in a transmitting system than as a structural schematic of the embodiments described herein. In practice, and as recognized by those of ordinary skill in the art, items shown separately could be combined and some items could be separated. Further, in some embodiments, one or more modules of transmitting system 200 are implemented in transmitting system 120 (e.g., in processing circuitry 102) of FIG. 1.

Figure 2B:
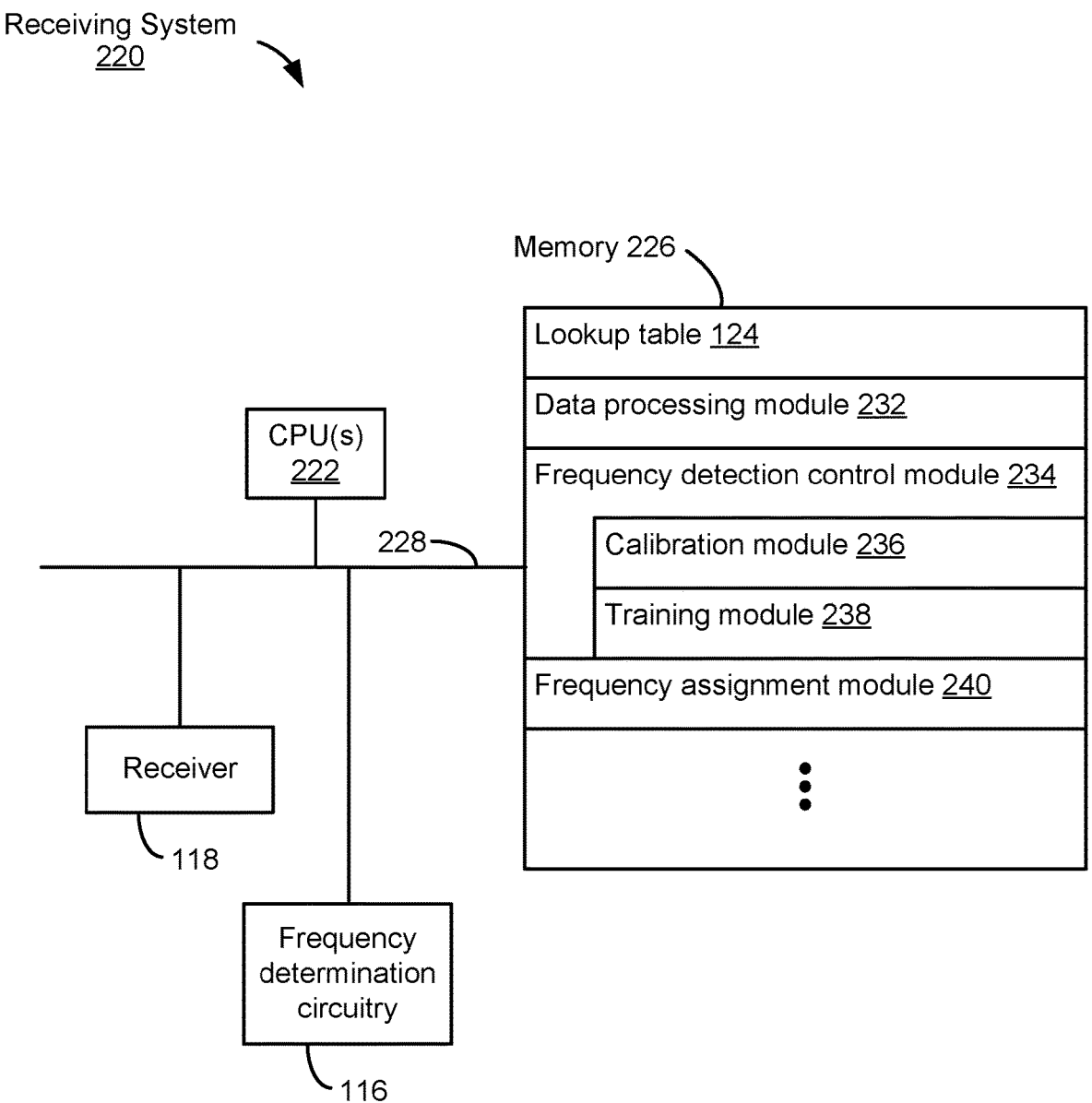
FIG. 2B is a block diagram illustrating an example implementation of a receiving system, in accordance with some embodiments.

FIG. 2B is a block diagram illustrating an example implementation of a receiving system 220, in accordance with some embodiments. In some embodiments, receiving system 220 is used in communication system 100, FIG. 1 (e.g., in place of receiving system 140) for receiving signals representing data (e.g., transmitted information).

In some embodiments, receiving system 220 includes one or more processing units 222 (e.g., sometimes called processors or CPUs, and implemented using processors or processing cores, as described above) for executing modules, programs and/or instructions stored in memory 226 for performing operations described herein; memory 226; and one or more communication buses 228 for interconnecting these components. Communication buses 228 optionally include circuitry (sometimes called a chipset) that interconnects and controls communications between system components. In some embodiments, receiving system 220 includes receiver 118 and frequency determination circuitry 120 (e.g., as described herein with reference to FIG. 1).

In some embodiments, memory 226 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 226 optionally includes one or more storage devices remotely located from processors 222. In some embodiments, memory 226, or the non-volatile memory device(s) within memory 226, includes a non-transitory computer readable storage medium. In some embodiments, memory 226, or the computer readable storage medium of memory 226, stores the following programs, modules, and data structures, or a subset or superset thereof:

lookup table 124, used for storing associations of units of data to symbols and frequencies (e.g., as described herein with reference to FIG. 1);

data processing module 232, used for identifying symbols represented by detected frequencies, identifying units of data represented by the identified symbols, and aggregating the units of data for processing;

frequency detection control module 234, used for controlling frequency determination circuitry 120 to detect frequencies of received signals (e.g., from receiver 118), optionally including:

calibration module 236, used for controlling, generating, and processing signals used for internal calibration of frequency determination circuitry 120 (e.g., used local calibration of receiving system 220); and training module 238, used for processing one or more calibration signals (sometimes called a "training sequence") received from a transmitting system and used to correct for or mitigate transmission errors between the transmitting system and receiving system 220.

frequency assignment module 240, used for updating lookup table 124 with updated assignments of units of data and symbols to a different set of frequency bands (or to respective frequencies within the set of frequency bands) received from a transmitting system.

Each of the above identified elements may be stored in one or more of the previously mentioned memory devices that together form memory 226, and corresponds to one or more sets of instructions for performing a function described above. The above identified modules or programs (i.e., sets of instructions) need not be implemented as separate software programs, procedures, or modules, and thus various subsets of these modules may be combined or otherwise rearranged in various embodiments. In some embodiments, memory 226 may store a subset of the modules and data structures identified above. In some embodiments, memory 226 may store additional modules and data structures not described above. In some embodiments, the programs, modules, and data structures stored in memory 226, or the computer readable storage medium of memory 226, provide instructions for implementing respective operations in the methods described below with reference to FIGS. 5A-5C and 6A-6B.

Although FIG. 2B shows receiving system 220, FIG. 2B is intended more as a functional description of the various features that may be present in a receiving system than as a structural schematic of the embodiments described herein. In practice, and as recognized by those of ordinary skill in the art, items shown separately could be combined and some items could be separated. Further, in some embodiments, one or more modules of receiving system 220 are implemented in receiving system 140 (e.g., in processing circuitry 122) of FIG. 1.

FIGS. 3A-3B are block diagrams illustrating example lookup tables assigning frequencies to symbols and symbol data, in accordance with some embodiments. In particular, FIG. 3A illustrates example lookup table 104 for use in a transmitting system (e.g., transmitting system 120, FIG. 1, or transmitting system 200, FIG. 2A). Lookup table 104 assigns symbol data (e.g., each representing four bits of information, such as the data values 0000, 0001, 0010, etc.) to each of N symbols (e.g., symbols 0 through N−1). Each symbol is associated with a respective frequency. As shown in FIG. 3A, each symbol is associated with a nominal center frequency in a frequency band that is 62.5 kHz wide. It is noted that the frequency band for symbol 2 and the frequency band for symbol 3 are not contiguous. That is, the nominal center frequency of the frequency band immediately adjacent to and above the frequency band for symbol 2 is 10.419 kHz, but this frequency is not assigned to any of the N symbols. Accordingly, the assigned frequency bands, in aggregate, are not contiguous. In some embodiments, lookup table 104 is used by a transmitting system to identify, from data for transmission, units of data corresponding to symbols (e.g., the four-bit data values 0000, 0001, etc.) and, in turn, frequencies representing the symbols.

Analogously, FIG. 3B illustrates example lookup table 124 for use in a receiving system (e.g., receiving system 140, FIG. 1, or receiving system 220, FIG. 2B). Lookup table 124 assigns respective frequencies to each of the N symbols (e.g., symbols 0 through N−1). Each symbol is associated with respective symbol data (e.g., respective four-bit data values, such as 0000, 0001, 0010, etc.). As shown in FIG. 3B, each symbol is associated with a nominal center frequency in a frequency band that is 62.5 kHz wide. It is noted that the frequency band for symbol 2 and the frequency band for symbol 3 are not contiguous. That is, the nominal center frequency of the frequency band immediately adjacent to and above the frequency band for symbol 2 is 10.419 kHz, but this frequency is not assigned to any of the N symbols. Accordingly, the assigned frequency bands, in aggregate, are not contiguous. In some embodiments, lookup table 124 is used by a receiving system to identify symbols from determined frequencies of received signal pulses, and in turn, units of data corresponding to the identified symbols (e.g., the four-bit data values 0000, 0001, etc.).

Figure 3C:
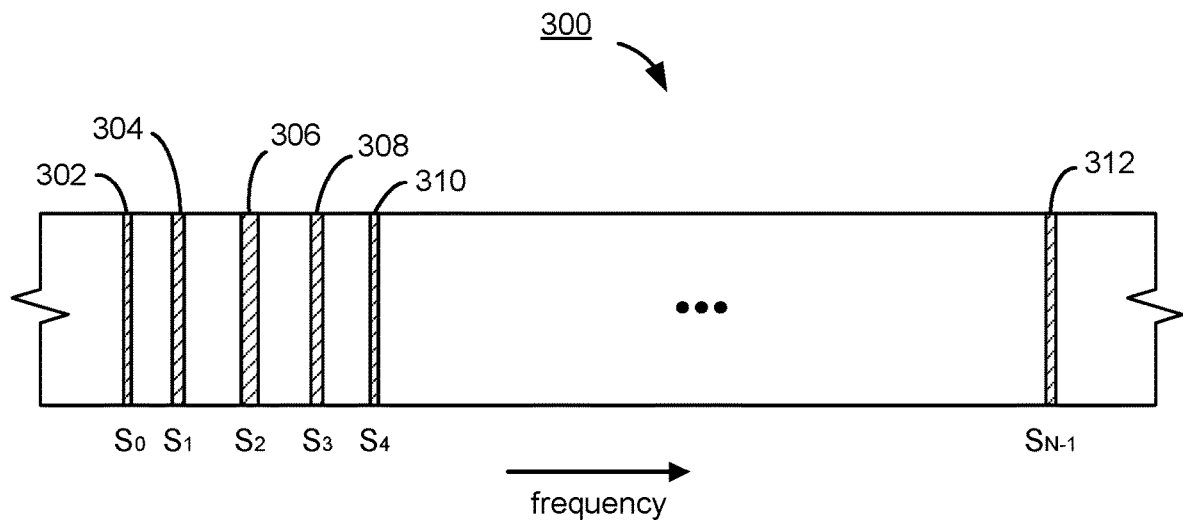
FIG. 3C is a conceptual diagram showing example allocations of a frequency spectrum, in accordance with some embodiments.

In some embodiments, symbols in the predefined set of N symbols need not be assigned to frequency bands in order. For example, although FIG. 3C shows symbol $S_0$ assigned to a lower frequency band than the frequency band to which $S_1$ is assigned, and $S_N$ assigned to the highest frequency band, in some cases a respective symbol $S_i$ may be assigned to a higher frequency band than the frequency band to which the next symbol $S_{i+1}$ is assigned. Table 1 provides an illustrative example of symbols in a predefined set of 8 symbols being assigned to frequency bands without regard to any particular ordering of the symbols.

TABLE 1

| Frequency Band (MHz) | Nominal Frequency (MHz) | Symbol |
|---|---|---|
| 4.7-4.9 | 4.8 | $S_2$ |
| 9.1-9.3 | 9.2 | $S_3$ |
| 10.6-10.8 | 10.7 | $S_7$ |
| 11.4-11.6 | 11.5 | $S_0$ |
| 11.7-11.9 | 11.8 | $S_5$ |
| 14.7-14.9 | 14.8 | $S_1$ |
| 18.5-18.7 | 18.6 | $S_4$ |
| 20.0-20.2 | 20.1 | $S_6$ |

In some embodiments, instead of assigning frequencies or frequency bands to symbols, lookup tables 104 and 124 assign frequency differences (sometimes called frequency shifts) to symbols. In some embodiments, the difference in frequency between a respective signal pulse and a most-recent prior signal pulse (e.g., with no intervening signal pulses) is used to represent a symbol. In some embodiments, a transmitting system prepares to transmit a first symbol by determining, using a lookup table, a first frequency difference associated with the first symbol. In some embodiments, the transmitting system then transmits the first signal by transmitting a first signal pulse at a first frequency, and a second signal pulse at a second frequency, where the difference between the second frequency and the first frequency (or the absolute value of the difference) is the first frequency difference. In some embodiments, a receiving system receives a first signal pulse and determines a first frequency of the first signal pulse, and then receives a second signal pulse and determines a second frequency of the second signal pulse, where the difference between the second frequency and the first frequency (or the absolute value of the difference) is a respective frequency difference. In some embodiments, the receiving system determines, using a lookup table, the symbol corresponding to the determined frequency difference. It is noted that where frequency differences are used to represent symbols instead of frequencies, the frequency bands used to transmit signal pulses may or may not be contiguous, and may be widely separated rather than confined to a narrow frequency range.

FIG. 3C is a conceptual diagram showing example allocations of a frequency spectrum 300, in accordance with some embodiments. Frequency spectrum 300 includes a set of frequency bands associated with a predefined set of N symbols $S_0$ through $S_{N-1}$. Each respective symbol in the predefined set is associated with a distinct frequency band in the set of frequency bands in frequency spectrum 300. For example, as shown in FIG. 3C, frequency spectrum 300 includes non-contiguous frequency bands 302, 304, 306, 308, 310, and 312. Frequency band 302 is associated with (e.g., represents) symbol $S_0$; frequency band 304 is associated with symbol $S_1$; frequency band 306 is associated with symbol $S_2$; frequency band 308 is associated with symbol $S_3$; frequency band 310 is associated with symbol $S_4$; and frequency band 312 is associated with symbol $S_{N-1}$. The set of frequency bands (which includes frequency bands 302, 304, 306, 308, 310, and 312) associated with the predefined set of N symbols, in aggregate, are not contiguous.

Figure 3D:
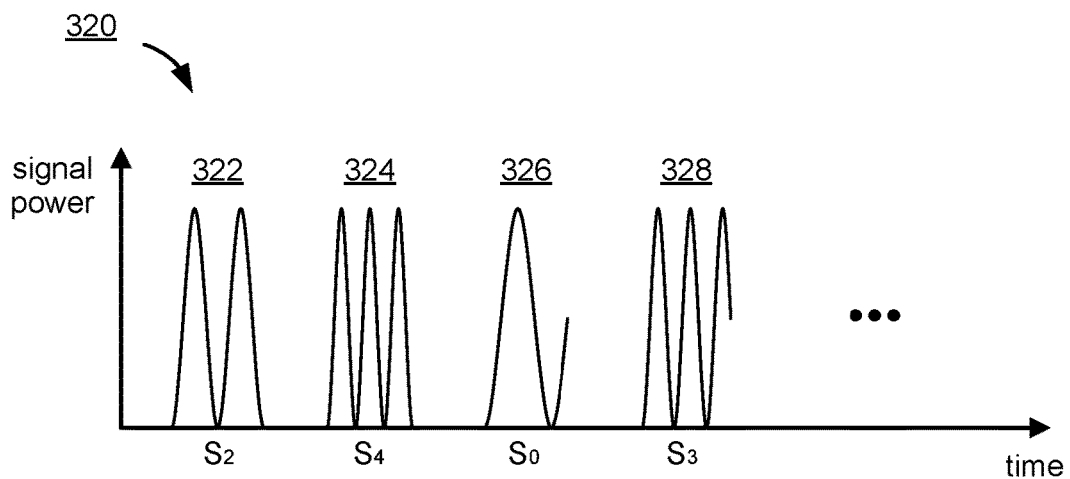
FIG. 3D illustrates an example sequence of discrete-frequency signals, in accordance with some embodiments.

FIG. 3D illustrates an example sequence 320 of discrete-frequency signals, in accordance with some embodiments. In some embodiments, sequence 320 is transmitted by a transmitting system (e.g., transmitting system 120, FIG. 1, or transmitting system 200, FIG. 2A) or a component of a transmitting system (e.g., transmitter 114, FIG. 1). In some embodiments, sequence 320 is received by a receiving system (e.g., receiving system 140, FIG. 1, or receiving system 220, FIG. 2B) or a component of a receiving system (e.g., receiver 118, FIG. 1). Each signal pulse in the sequence represents a respective symbol of the predefined set of N symbols based on the frequency of the signal pulse. For example, sequence 320 includes a first signal pulse 322 at a first frequency that represents symbol $S_2$, followed by a second signal pulse 324 at a second frequency that represents symbol $S_4$, followed by a third signal pulse 326 at a third frequency that represents symbol $S_0$, followed by a fourth signal pulse 328 at a fourth frequency that represents symbol $S_3$. Sequence 320 optionally includes one or more additional signal pulses at respective frequencies representing respective symbols in the predefined set of symbols.

Figure 3E:
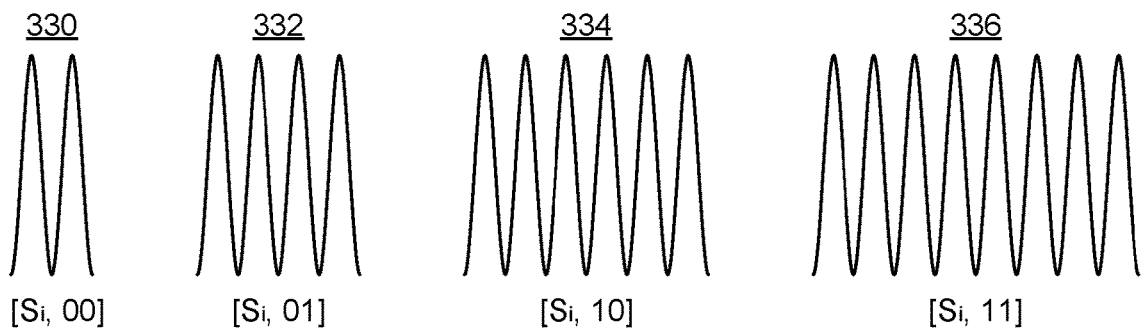
FIG. 3E illustrates example variations in signal duration for representing multiple symbols using a given frequency.

FIG. 3E illustrates example variations in signal duration for representing multiple symbols using a given frequency. In some embodiments, a first number of bits of information is represented by the particular frequency of a given signal pulse. In some embodiments, a second number of bits of information is represented by the length of a signal pulse at the particular frequency. For example, FIG. 3E illustrates four signal pulses 330, 332, 334, and 336. Signal pulse 330 has a frequency that represents a symbol $S_i$. In addition, in the example shown in FIG. 3E, the length of signal pulse 330 is one of four possible signal lengths and corresponds to data value "00." As such, signal pulse 330 represents the information of symbol $S_i$ in combination with two additional bits of information, "00."

Signal pulse 332 in FIG. 3E has the same frequency as signal pulse 332 and thus is also associated with the symbol $S_i$. In addition, the length of signal pulse 332 corresponds to data value "01." As such, signal pulse 332 represents the information of symbol $S_i$ in combination with two additional bits of information, "01."

Likewise, signal pulse 334 has the same frequency as signal pulses 330 and 332 and thus is also associated with the symbol $S_i$. In addition, the length of signal pulse 334 corresponds to data value "10." As such, signal pulse 334 represents the information of symbol $S_i$ in combination with two additional bits of information, "10."

Finally, signal pulse 336 has the same frequency as signal pulses 330, 332, and 334, and thus is also associated with the symbol $S_i$. In addition, the length of signal pulse 336 corresponds to data value "11." As such, signal pulse 336 represents the information of symbol $S_i$ in combination with two additional bits of information, "11."

One of ordinary skill in the art will readily appreciate that any number of different signal pulse lengths can be used to represent additional information beyond the symbol represented by the signal frequency.

Figure 4:
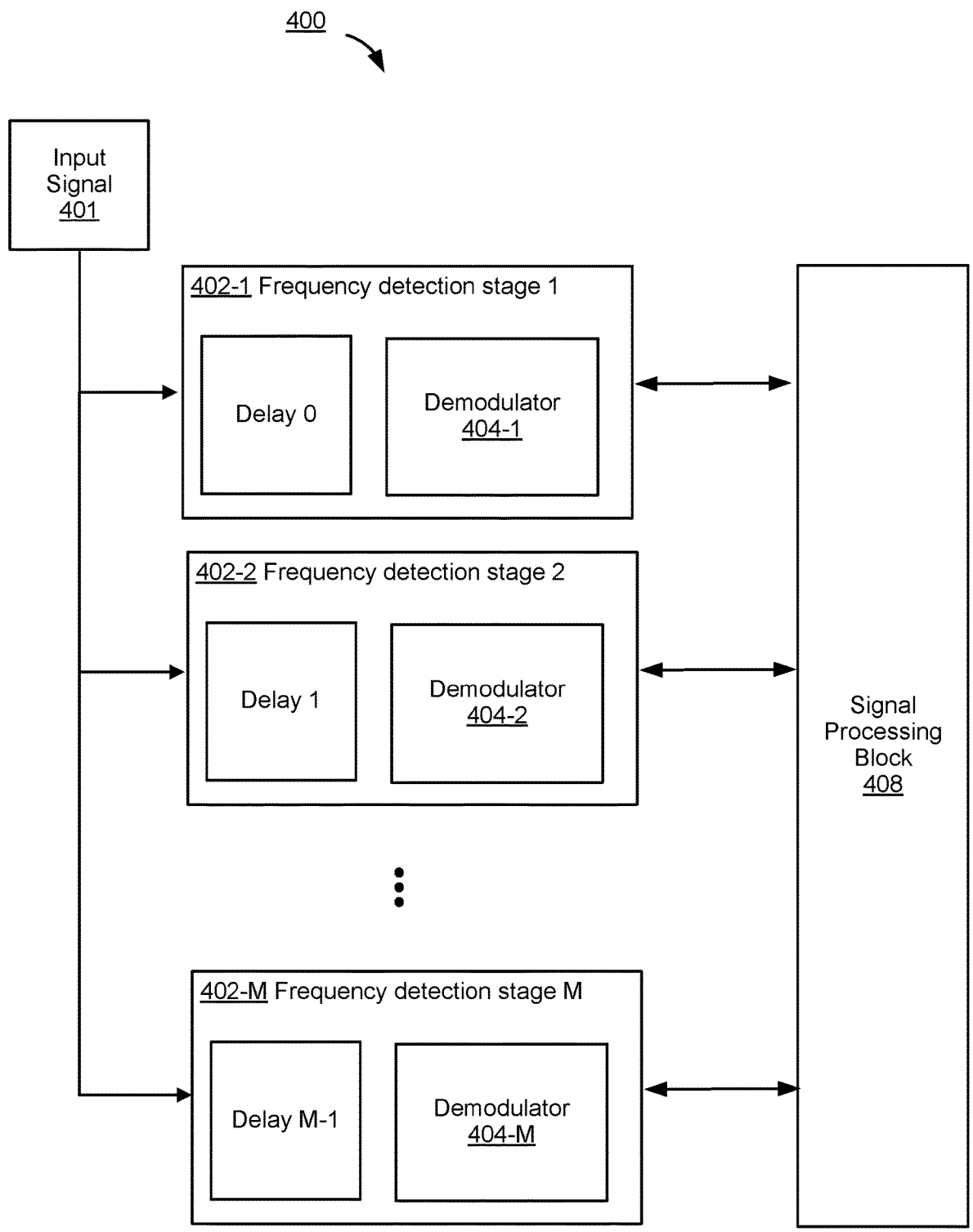
FIG. 4 is a block diagram illustrating an example implementation of frequency detection circuitry, in accordance with some embodiments.

FIG. 4 is a block diagram illustrating an example implementation of frequency detection circuitry 400, in accordance with some embodiments. In some embodiments, frequency detection circuitry 400 corresponds to, or is part of, frequency determination circuitry 120 (FIG. 1), or frequency detector 128 (FIG. 1). In some embodiments, frequency detection circuitry 400 is used to detect the frequency of an input signal 401. In some embodiments, frequency detection circuitry includes one or more frequency detection stages 402.

Input signal 401 is received at a first frequency detection stage 402-1. In some embodiments, no delay (e.g., a delay of zero) is applied to input signal 401 upon being received at frequency detection stage 402-1. In some embodiments, demodulator 404-1 in first frequency detection stage 402-1 compares received input signal 401 to respective frequencies in a plurality of candidate frequency bands (or frequency ranges). Demodulator 404-1 determines a particular first frequency band of the candidate frequency bands that has the greatest degree of correlation with input signal 401. The determined frequency first band is interpreted to be the frequency band in which the frequency of the received input signal 401 must exist. In some embodiments, the results of frequency detection stage 402-1 (e.g., the outputs of demodulator 404-1) are provided to a signal processing block 408.

In some embodiments, input signal 401 is provided to second frequency detection stage 404-2, which delays input signal 401 (e.g., with a first amount of delay). The delayed input signal is provided to second demodulator 404-2. In some embodiments, the determined first frequency band from demodulator 404-1 is subdivided into a second plurality of (narrower) candidate frequency bands. In some embodiments, signal processing block 408 receives the identification of the first frequency band from frequency detection stage 402-1, determines the subdivisions, and configures frequency detection stage 402-2 (or a component of frequency detection stage 402-2, such as demodulator 404-2) using the second plurality of candidate frequency bands. In some embodiments, second demodulator 404-2 compares the delayed input signal to respective frequencies in the second plurality of candidate frequency bands (e.g., the subdivisions of the determined first frequency band from frequency detection stage 402-1). Second demodulator 404-2 determines a particular second frequency band (narrower than the first frequency band) of the second plurality of candidate frequency bands that has the greatest degree of correlation with the delayed input signal. The determined second frequency band is interpreted to be the frequency band in which the frequency of the received input signal 401 must exist.

One of ordinary skill will readily appreciate that any number M of frequency detection stages (e.g., up to and including frequency detection stage 402-M) are used to determine the frequency of input signal 401 with increasingly greater accuracy, through successive delays of input signal 401 and successive subdivision of frequency bands determined by preceding stages into narrower candidate frequency bands, and comparison of the delayed input signals to the increasingly narrower candidate frequency bands (e.g., by demodulators up to and including demodulator 404-M). In some embodiments, signal processing block 408 obtains the identified frequency band of each preceding stage and uses the identified frequency band to configure each successive frequency detection stage with the narrowed set of candidate frequency bands based on the identified frequency band.

In some embodiments, delays for successive frequency detection stages increases linearly. In some embodiments, delays for successive frequency detection stages increase exponentially by a predefined multiple. For example, a first stage applies zero delay; a second stage applies a first amount of delay; a third stage applies a second amount of delay that is a predefined multiple M of the first amount of delay; a fourth stage applies a third amount of delay that is $M^2$ times the first amount of delay, etc.

Figure 5A:
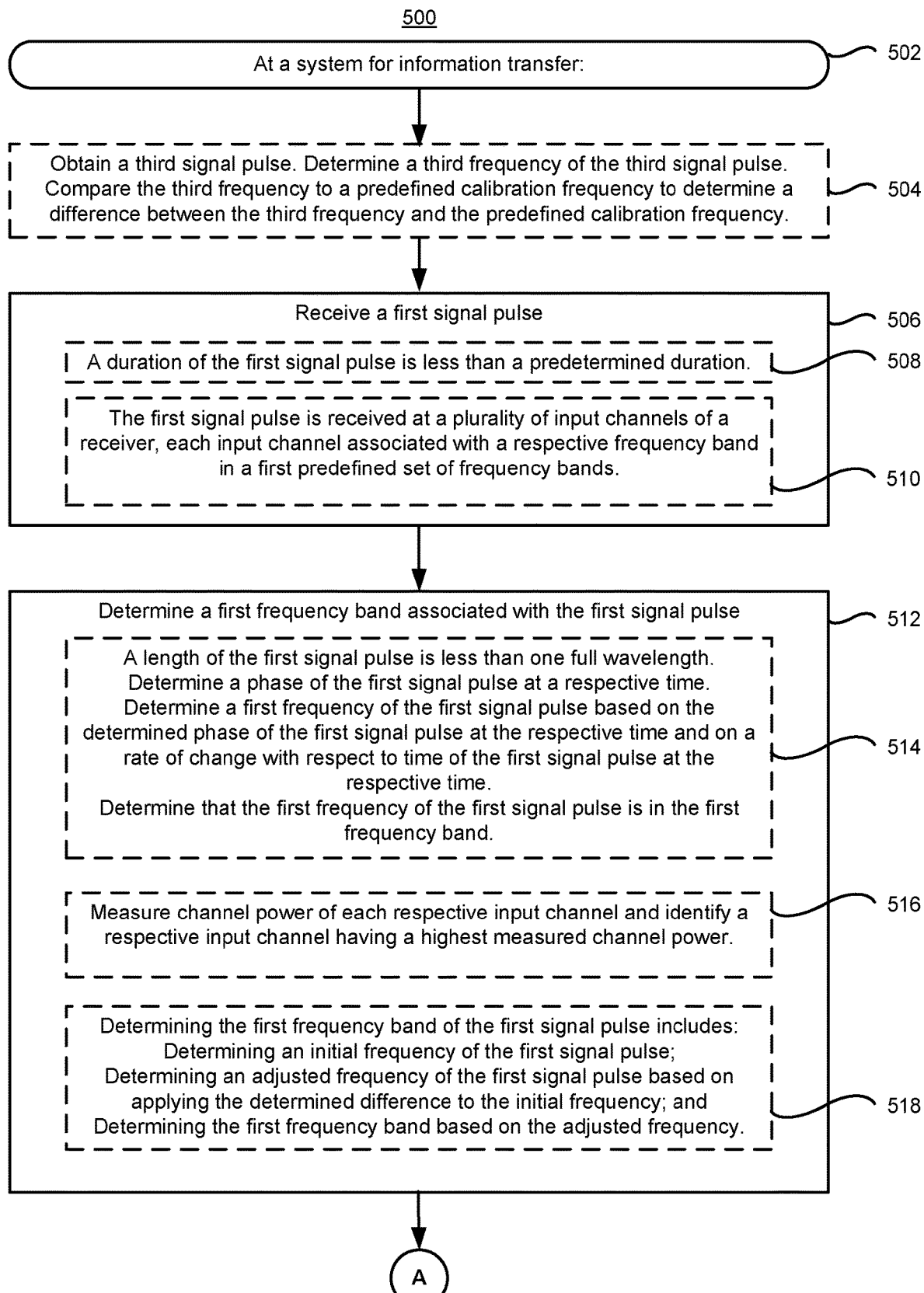
FIGS. 5A-5C are flow diagrams illustrating an example method of receiving information, in accordance with some embodiments.
Figure 5B:
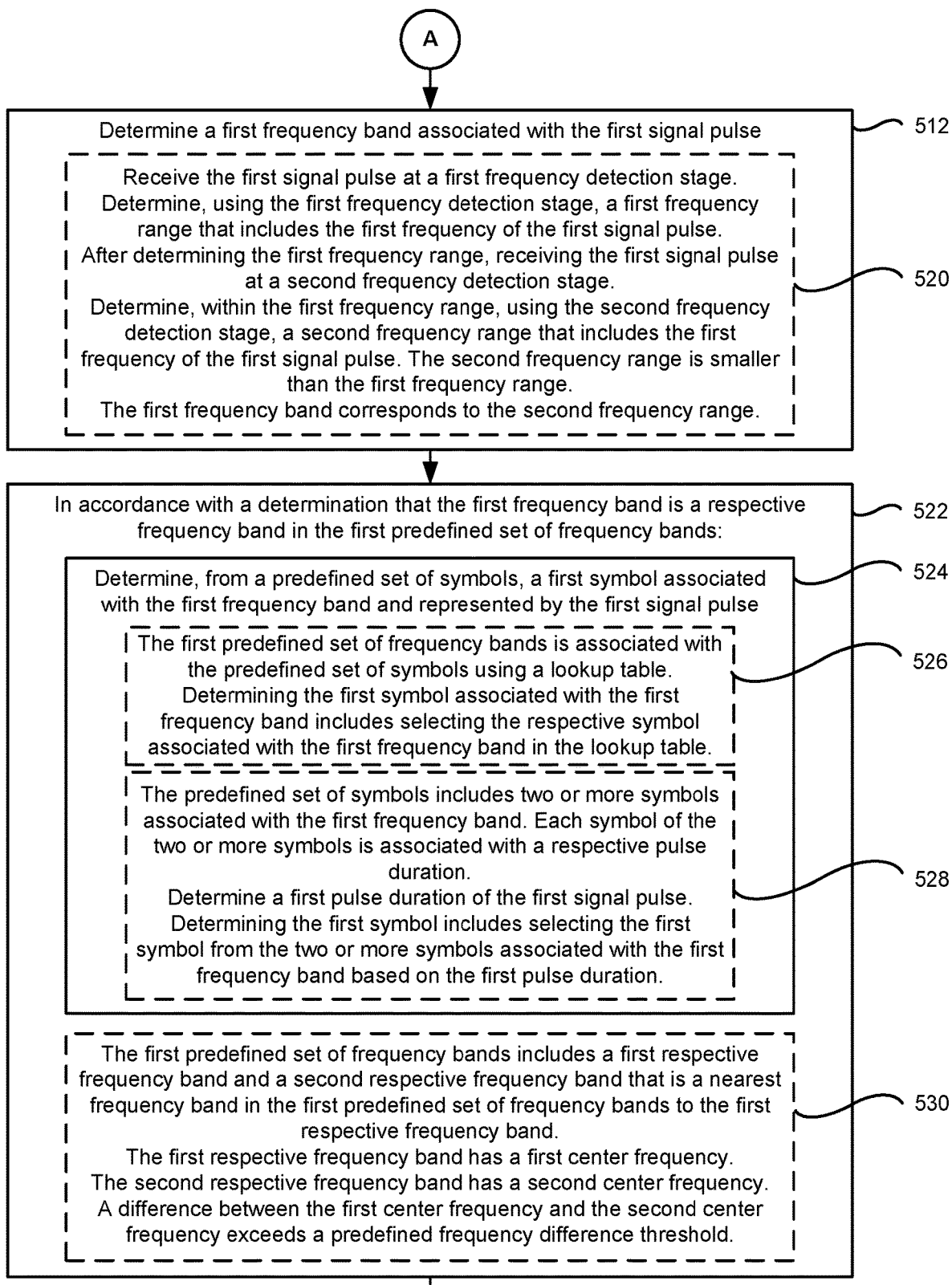
Figure 5C:
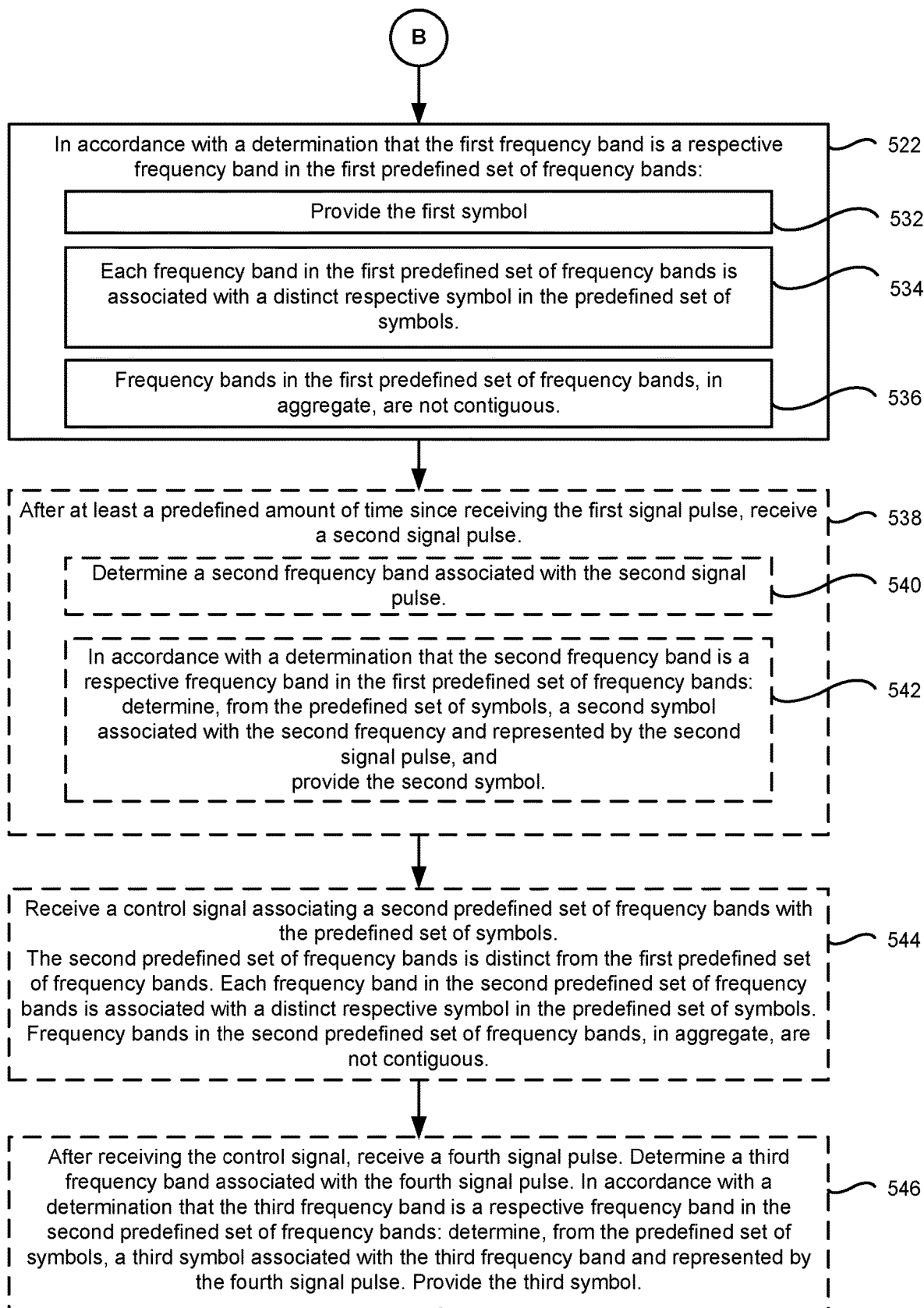

FIGS. 5A-5C are flow diagrams illustrating an example method 500 of receiving information, in accordance with some embodiments. In some embodiments, and as described herein, method 500 is performed at a system for information transfer (e.g., receiving system 140, FIG. 1, or receiving system 220, FIG. 2B). In some embodiments, the system includes a receiver (e.g., receiver 118, FIG. 1), frequency discrimination circuitry (e.g., frequency determination circuitry 116, FIG. 1), and processing circuitry (e.g., processing circuitry 122, FIG. 1). In some embodiments, the processing circuitry is implemented using one or more processors (e.g., CPU(s) 222, FIG. 2B), and memory (e.g., memory 226, FIG. 2B) storing one or more programs for execution by the one or more processors, the one or more programs including instructions for performing operations described herein. In some embodiments, the processing circuitry is implemented using hardware circuitry such as one or more field-programmable gate arrays (FPGAs) or application-specific integrated circuits (ASICs) configured to perform the operations described herein. In some embodiments, the system includes or is electrically coupled with a lookup table (e.g., lookup table 124, FIG. 3B) storing a (first) predefined set of frequencies and/or frequency bands and a predefined set of symbols (e.g., bit patterns representing data), where each frequency is associated with a respective symbol.

In some embodiments, at the system for information transfer (502), before receiving a first signal pulse, the system obtains (504) a third signal pulse (e.g., for calibration). In some embodiments, the system determines a third frequency of the third signal pulse and compares the third frequency to a predefined calibration frequency to determine a difference between the third frequency and the predefined calibration frequency. In some embodiments, frequency detection circuitry of, or electrically coupled with, the receiver is susceptible to measurement errors, such as errors resulting from propagation delays or internal biases within the frequency detection circuitry that may vary with environmental factors (e.g., ambient temperature changes, or temperature changes in one or more components in the frequency detection circuitry). In some embodiments, a calibration pulse at a predefined calibration frequency (e.g., the third signal pulse) is used to calibrate the frequency detection circuitry to correct for such errors. Accordingly, in some embodiments, obtaining the third signal pulse includes generating the third signal pulse at the known predefined calibration frequency by the receiver, or by receiver-side signal generation circuitry electrically coupled to the frequency detection circuitry. In some such embodiments, the third signal pulse is not provided by the transmitter.

In some embodiments, one or more additional pulses similar to the third signal pulse can be generated (at the receiver side) and provided as an input to the frequency detection circuitry. In some embodiments, the third pulse and any additional pulses are generated during anticipated gaps in received transmissions (e.g., times during which transmissions are not expected to be received). In some embodiments, the third pulse and any additional pulses are generated periodically. In some embodiments, the third pulse and any additional pulses are generated based on a detected rate of change of temperature of the frequency detection circuitry, or of the receiving system. In some embodiments, the third pulse and any additional pulses are generated based on a detected amount of time that the frequency detection circuitry, or the receiving system, has been in operation (e.g., since being powered on).

In some embodiments, the system (e.g., the receiver, or frequency measurement circuitry) determines the frequency of the third signal pulse and compares it to the known and expected predefined calibration frequency, to determine an offset (e.g., positive or negative value) between the measured frequency and the expected frequency. In some embodiments, the offset represents the effect of the errors local to the receiving system as described above. In some embodiments, the offset is applied to adjust measured frequencies of subsequently received pulses (e.g., step 518), and frequency bands associated with the subsequently received pulses are determined from the offset-adjusted frequencies.

In some embodiments, a calibration pulse at a predefined calibration frequency is transmitted from a transmitter prior to transmitting one or more signal pulses representing respective symbols. In some embodiments, the receiver treats an initial pulse in a series of pulses (e.g., a pulse received after a predetermined timeout period since a most-recently-received signal pulse) as a calibration pulse, determines the frequency of the initial pulse, and compares the frequency of the initial pulse to the predefined calibration frequency to determine an offset (e.g., positive or negative value). In some embodiments, the offset represents the effect of Doppler shift on the received pulse. In some embodiments, the offset is applied to adjust measured frequencies of subsequently received pulses, and frequency bands associated with the subsequently received pulses are determined from the offset-adjusted frequencies. In some embodiments, a series of calibration pulses at different calibration frequencies are transmitted (e.g., prior to transmitting the one or more signal pulses), and the receiver compares each received calibration pulse to a set of predefined calibration frequencies to determine respective offsets at each of the predefined calibration frequencies. In some embodiments, the series of calibration pulses are transmitted uninterrupted by transmission of signal pulses representing respective symbols. In some embodiments, one or more calibration pulses are transmitted in between transmission of signal pulses representing respective symbols (e.g., calibration pulses are alternated, or otherwise interleaved, with signal pulses representing symbols).

The system receives (506) a first signal pulse (e.g., a respective signal pulse as shown in and described herein with reference to FIG. 3D). In some embodiments, a duration of the first signal pulse is less than a predetermined duration (508). For example, the duration of the first signal pulse is less than 1 μs. In some embodiments, a duration of the first signal pulse includes at least one full period (of a wave) at the first frequency. In some embodiments, a duration of the first signal pulse is less than one full period at the first frequency.

In some embodiments, the first signal pulse is received (510) at a plurality of input channels of a receiver, each input channel associated with a respective frequency band in a first predefined set of frequency bands.

The system determines (512) a first frequency band associated with the first signal pulse. In some embodiments, a length of the first signal pulse is less (514) than one full wavelength. In some embodiments, the system determines a phase of the first signal pulse at a respective time. In some embodiments, the determined phase corresponds to a zero-crossing of the first signal pulse. In some embodiments, the system determines a first frequency of the first signal pulse based on the determined phase of the first signal pulse at the respective time and on a rate of change with respect to time (e.g., slope) of the first signal pulse at the respective time. In some embodiments where the determined phase corresponds to a zero-crossing of the first signal pulse, the first frequency of the first signal pulse is determined based on the slope (which can be either positive or negative) of the first signal pulse at the zero-crossing. In some embodiments, the system determines that the first frequency of the first signal pulse is in the first frequency band.

In some embodiments, determining the first frequency band associated with the first signal pulse includes measuring (516) channel power of each respective input channel and identifying a respective input channel having a highest measured channel power. In some embodiments, the first frequency band is the respective frequency band associated with the identified input channel.

In some embodiments, determining the first frequency band of the first signal pulse includes (518) determining an initial frequency of the first signal pulse, determining an adjusted frequency of the first signal pulse based on applying the determined difference (e.g., determined in step 504) to the initial frequency, and determining the first frequency band based on the adjusted frequency.

In some embodiments, determining the first frequency band associated with the first signal pulse comprises using cascaded instantaneous frequency measurement (IFM) (e.g., as described herein with reference to FIG. 4). In some embodiments, the system receives (520) the first signal pulse (e.g., input signal 401, FIG. 4) at a first frequency detection stage (e.g., first frequency detection stage 402-1, FIG. 4). In some embodiments, the system determines, using the first frequency detection stage, a first frequency range that includes the first frequency of the first signal pulse (e.g., a first range of possible frequencies of the first signal pulse). In some embodiments, after determining the first frequency range, the system receives the first signal pulse at a second frequency detection stage (e.g., second frequency detection stage 402-2, FIG. 4) (e.g., by delaying the first signal pulse, and receiving the delayed first signal pulse at the second frequency detection stage). In some embodiments, the system determines, within the first frequency range, using the second frequency detection stage, a second frequency range that includes the first frequency of the first signal pulse. In some embodiments, the second frequency range is smaller than the first frequency range. In some embodiments, the first frequency band corresponds to the second frequency range.

In some embodiments, any number of additional frequency detection stages (e.g., through frequency detection stage 402-M, FIG. 4) are used, where each subsequent frequency detection stage is used to further narrow the possible range of the frequencies of the first signal pulse, to determine a sufficiently narrow frequency band that necessarily includes the frequency of the received signal. In some embodiments, a frequency band determined by a respective frequency detection stage is sufficiently narrow when it corresponds to only one frequency band in the first predefined set of frequency bands, such that a represented symbol can be determined. For example, a subsequent (e.g., third, fourth, fifth, etc.) frequency detection stage narrows the second frequency range to a frequency range that includes substantially the same frequencies as (e.g., at least 90%, 95%, or 98% overlap, etc.), or is smaller than, a respective frequency band in the first predefined set of frequency bands. In this example, the first frequency band is determined to be the respective frequency band. In some embodiments, the frequencies, or frequency bands, of calibration signal pulses and/or signal pulses representing symbols are determined using this approach. In some embodiments, the first, second, and any other frequency detection stages together form at least a portion of frequency detection circuitry that is part of, or in some embodiments electrically coupled with, a receiver. In some embodiments, a processing module or processing circuitry (e.g., signal processing block 408, FIG. 4) is used to configure the candidate frequencies considered by a respective subsequent frequency stage based on results determined (e.g., a frequency band identified) at a respective preceding frequency stage.

In accordance with a determination that the first frequency band is a respective frequency band in the first predefined set of frequency bands (522), the system determines (524), from a predefined set of symbols, a first symbol associated with the first frequency band and represented by the first signal pulse.

In some embodiments, the first predefined set of frequency bands includes a plurality of frequency bands. In some embodiments, the first frequency is determined to be a nominal (e.g., center) frequency in the first frequency band, or within a predefined threshold (e.g., within 1%, 5%, 7% or 10%) of the nominal frequency in the first frequency band. For example, as described with reference to FIGS. 3A-3B the frequencies associated with symbols are center frequencies in their respective 62.5 kHz frequency bands.

In some embodiments, the first predefined set of frequency bands is associated (526) with the predefined set of symbols using a lookup table (e.g., lookup table 124, FIG. 3B). For example, the lookup table maps each frequency band in the first predefined set of frequency bands to a distinct respective symbol in the predefined set of symbols. In some embodiments, determining the first symbol associated with the first frequency band includes selecting the respective symbol associated with the first frequency band in the lookup table.

In some embodiments, the predefined set of symbols includes (528) two or more symbols associated with the first frequency band, each symbol of the two or more symbols associated with a respective pulse duration. In some embodiments, the system determines a first pulse duration of the first signal pulse. In some embodiments, determining the first symbol includes selecting the first symbol from the two or more symbols associated with the first frequency band based on the first pulse duration. For example, the system selects the symbol in the two or more symbols whose associated pulse duration (sometimes called pulse width) corresponds to the first pulse duration of the first signal pulse. For example, as described herein with reference to FIG. 3E, a respective frequency, or frequency band, is associated with four symbols (e.g., distinguished by the additional information 00, 01, 10, and 11), and the respective frequency is associated with a nominal pulse duration (e.g., 900 ns). In this example, a signal at the respective frequency can be transmitted using a pulse duration of 800 ns, 850 ns, 900 ns, or 950 ns. At the respective frequency, these pulse durations represent the symbols 00, 01, 10, and 11, respectively. Thus, for example, a received signal at the respective frequency having a pulse duration of 950 ns is interpreted as the symbol 11. Altering the pulse duration of the transmitted pulse enables a given frequency to represent additional bits of information.

In some embodiments, the predefined set of symbols includes a plurality of symbols. In some embodiments, both the frequency and the represented symbol are determined from the same first signal pulse (e.g., the same (entire) portion of the signal), in contrast to implementations where frequency of a carrier signal must first be determined from a first portion of the carrier signal prior to, and separately from, determining one or more symbols from a second, subsequent, portion of the carrier signal.

In some embodiments, the first predefined set of frequency bands includes (530) a first respective frequency band and a second respective frequency band that is a nearest frequency band in the first predefined set of frequency bands to the first respective frequency band. In some embodiments, the first respective frequency band has a first center frequency. In some embodiments, the second respective frequency band has a second center frequency. In some embodiments, a difference between the first center frequency and the second center frequency exceeds a predefined frequency difference threshold. In some embodiments, the separation of a respective frequency band from its nearest frequency band in a predefined set of frequency bands, such as the first predefined set of frequency bands, accounts for potential Doppler shift of a signal transmitted at the center frequency of the respective frequency band, as a result of a non-zero relative velocity between the receiver and a transmitter transmitting the signal.

In some embodiments, a maximum Doppler shift is estimated based on a respective (center) frequency, a maximum estimated velocity of the receiver, and a maximum estimated velocity of the transmitter (e.g., the negative of the maximum velocity of the receiver, due to the transmitter moving in the opposite direction from the receiver). In other words, the maximum Doppler shift can be estimated based on the respective (center) frequency and two times a maximum possible speed of a transmitter or receiver (or of a vehicle or craft carrying the transmitter or receiver). In some embodiments, the predefined frequency difference threshold is large enough such that when a signal at a center frequency of a respective frequency band is transmitted, even with the maximum Doppler shift, the receiver can determine the signal's intended frequency band. In some cases, the frequency of the received signal, even with the maximum Doppler shift, is still within the intended frequency band. In some cases, the frequency of the received signal, even with the maximum Doppler shift, falls closer to the intended frequency band than to any other frequency band in the predefined set of frequency bands. In some embodiments, nearest frequency bands in the predefined set of frequency bands are sufficiently separated (e.g., by at least the predefined frequency difference threshold) such that an estimated maximum Doppler shift would not result in one symbol being mistaken for another. In some embodiments, the receiver need not account for (or attempt to account for) Doppler shift in received signals. In some embodiments, the predefined set of frequency bands are selected so as to obtain this benefit.

Furthermore, as one of ordinary skill in the art will appreciate, implementations where the predefined set of frequency bands are not contiguous enable separation of even relatively narrow frequency bands, in which case spectral efficiency can remain high while transmission errors due to Doppler shift are reduced or even eliminated. By contrast, in implementations requiring continuous spectrum, frequency bands would need to be widened in order to enable a receiver to forgo accounting for Doppler shift, which would reduce spectral efficiency.

The system provides (532) the first symbol. In some embodiments, the first symbol is used by one or more processors or processing modules for interpreting data represented by the first symbol. In some embodiments, the first symbol is, or represents, a first unit of information, such as a first bit pattern (e.g., a pattern of one or more bits), and the one or more processors interpret the information (e.g., bit pattern) of the first symbol, optionally in conjunction with one or more other units of information (e.g., bit patterns) of one or more other symbols, to interpret the data received.

In some embodiments, each frequency band in the first predefined set of frequency bands is associated (534) with a distinct respective symbol in the predefined set of symbols. In some embodiments, each respective symbol in the predefined set of symbols represents a distinct respective unit of information (e.g., a distinct bit pattern). In some embodiments, frequency bands in the first predefined set of frequency bands, in aggregate, are (536) not contiguous (e.g., as described herein with reference to FIGS. 3A-3C). In some embodiments, each frequency band is represented by a nominal frequency within the respective frequency band (e.g., the center frequency within the respective frequency band). In some embodiments, the first predefined set of frequency bands span at least two distinct ranges of frequencies separated by at least one range of frequencies (e.g., one frequency band) that is not part of the set of predefined frequency bands (e.g., as described herein with reference to FIGS. 3A-3B).

In some embodiments, after at least a predefined amount of time since receiving the first signal pulse, the system receives (538) a second signal pulse. In some embodiments, the predefined amount of time is measured from the time that (receipt of) the first signal pulse ends. In some embodiments, the predefined amount of time is measured from the time that the first signal pulse was initially received, and the predefined amount of time is longer than the duration of the first signal pulse, such that the second signal pulse is initially received after an amount of time after receipt of the first signal pulse ends. In some embodiments, the system determines (540) a second frequency band associated with the second signal pulse. In accordance with a determination that the second frequency band is a respective frequency band in the first predefined set of frequency bands (542), the system determines, from the predefined set of symbols, a second symbol associated with the second frequency band and represented by the second signal pulse, and provides the second symbol. In some embodiments, the second symbol is provided to one or more processors or processing modules for interpreting data represented by the second symbol. In some embodiments, the second symbol represents a bit pattern (e.g., a pattern of one or more bits), and the one or more processors interpret the bit pattern represented by the second symbol, optionally in conjunction with one or more other bit patterns represented by one or more other symbols (e.g., the first symbol), to interpret the data received.

In some embodiments, after receiving the first signal pulse, the system receives (544) a control signal (e.g., via a control channel, using a predefined control frequency band (known also to a transmitter)) associating a second predefined set of frequency bands with the predefined set of symbols. In some embodiments, the second predefined set of frequency bands is distinct from the first predefined set of frequency bands. In some embodiments, each frequency band in the second predefined set of frequency bands is associated with a distinct respective symbol in the predefined set of symbols. In some embodiments, at least one symbol in the predefined set of symbols is assigned to a frequency band in the second predefined set of frequency bands that is different from the frequency band in the first predefined set of frequency bands to which the symbol was assigned. In some embodiments, frequency bands in the second predefined set of frequency bands, in aggregate, are not contiguous.

In some embodiments, after receiving the control signal, the system receives (546) a fourth signal pulse. In some embodiments, the system determines a third frequency band associated with the fourth signal pulse. In some embodiments, in accordance with a determination that the third frequency band is a respective frequency band in the second predefined set of frequency bands, the system determines, from the predefined set of symbols, a third symbol associated with the third frequency band and represented by the fourth signal pulse, and provides the third symbol.

It should be understood that the particular order in which the operations in method 500 have been described is merely an example and is not intended to indicate that the described order is the only order in which the operations could be performed. One of ordinary skill in the art would recognize various ways to re-order the operations described herein. Additionally, it should be noted that details of other processes described herein with respect to other methods described herein (e.g., method 600) are also applicable in an analogous manner to method 500 described above with respect to FIGS. 5A-5C. For example, the signal pulses, symbols, units of data, frequencies, and frequency bands described above with reference to method 500 optionally have one or more of the characteristics of the signal pulses, symbols, units of data, frequencies, and frequency bands described herein with reference to other methods described herein (e.g., method 600). For brevity, these details are not repeated here.

Figure 6A:
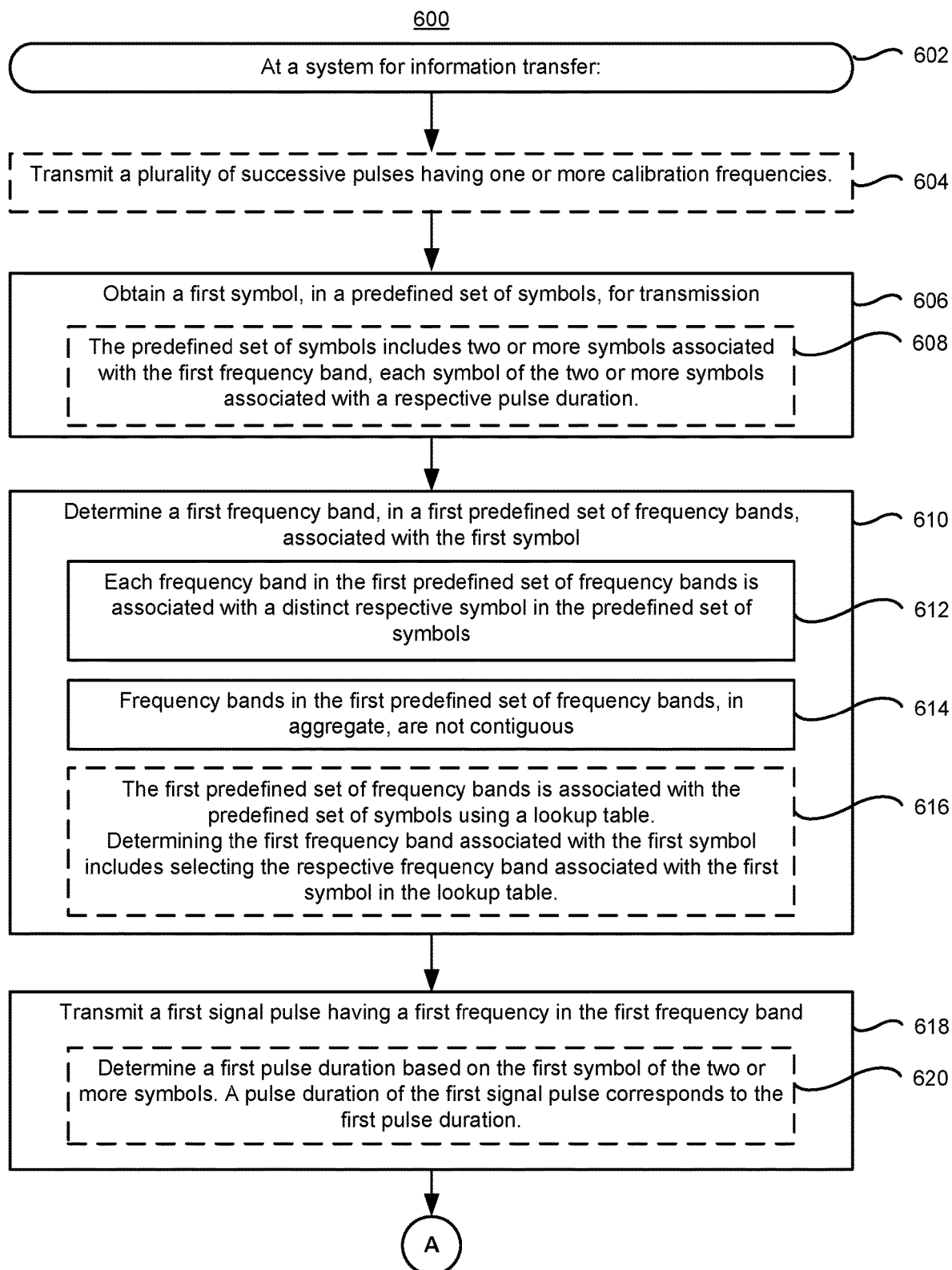
FIGS. 6A-6B are flow diagrams illustrating an example method of transmitting information, in accordance with some embodiments.
Figure 6B:
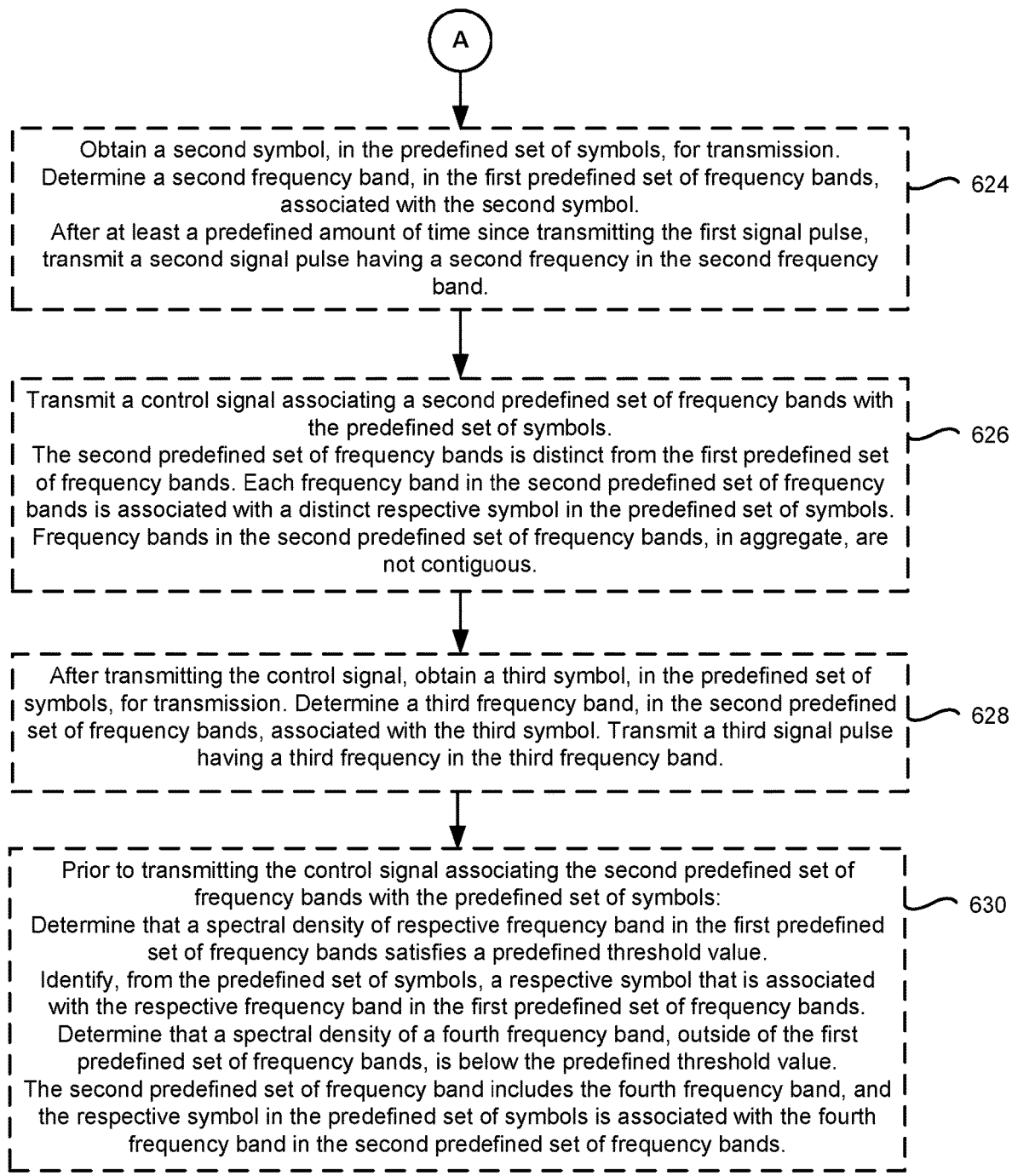

FIGS. 6A-6B are flow diagrams illustrating an example method 600 of transmitting information, in accordance with some embodiments. In some embodiments, and as described herein, method 600 is performed at a system for information transfer (e.g., transmitting system 120, FIG. 1, or transmitting system 200, FIG. 2A). In some embodiments, the system includes a transmitter (e.g., transmitter receiver 114, FIG. 1), frequency generation circuitry (e.g., frequency generation circuitry 106, FIG. 1), and processing circuitry (e.g., processing circuitry 102, FIG. 1). In some embodiments, the processing circuitry is implemented using one or more processors (e.g., CPU(s) 202, FIG. 2A), and memory (e.g., memory 206, FIG. 2A) storing one or more programs for execution by the one or more processors, the one or more programs including instructions for performing operations described herein. In some embodiments, the processing circuitry is implemented using hardware circuitry such as one or more field-programmable gate arrays (FPGAs) or application-specific integrated circuits (ASICs) configured to perform the operations described herein. In some embodiments, the system includes or is electrically coupled with a lookup table (e.g., lookup table 104, FIG. 3A) storing a predefined set of symbols (e.g., bit patterns representing data) and a (first) predefined set of frequencies and/or frequency bands, where each symbol is associated with a respective frequency.

At the system for information transfer (602), the system transmits (604) a plurality of successive pulses having one or more calibration frequencies. For example, a first pulse of the plurality of successive pulses corresponds to the third signal pulse, as described in step 504 of method 500.

The system obtains (606) a first symbol, in a predefined set of symbols, for transmission (e.g., a respective symbol in the predefined set of N symbols $S_0$ through $S_{N-1}$, as described herein with reference to FIGS. 3A-3D). In some embodiments, the first symbol represents a first unit of information. In some embodiments, the predefined set of symbols includes (608) two or more symbols associated with the first frequency band, each symbol of the two or more symbols associated with a respective pulse duration (e.g., as described herein with reference to FIG. 3E).

The system determines (610) a first frequency band, in a first predefined set of frequency bands, associated with the first symbol.

In some embodiments, each frequency band in the first predefined set of frequency bands is associated (612) with a distinct respective symbol in the predefined set of symbols. In some embodiments, each respective symbol in the predefined set of symbols represents a distinct respective unit of information (e.g., a distinct bit pattern). In some embodiments, frequency bands in the first predefined set of frequency bands, in aggregate, are (614) not contiguous (e.g., as described herein with reference to FIGS. 3A-3C). In some embodiments, the transmitter receives information for transmission, and identifies for transmission one or more symbols representing the information (e.g., each symbol representing a respective unit of the information).

In some embodiments, the first predefined set of frequency bands is associated (616) with the predefined set of symbols using a lookup table (e.g., lookup table 104, FIG. 3A) (e.g., the lookup table maps each frequency band in the first predefined set of frequency bands to a distinct respective symbol in the predefined set of symbols). In some embodiments, determining the first frequency band associated with the first symbol includes selecting the respective frequency band associated with the first symbol in the lookup table.

The system transmits (618) a first signal pulse having a first frequency in the first frequency band (e.g., a nominal frequency, such as a center frequency, in the first frequency band). In some embodiments, a respective transmitted signal pulse, such as the first signal pulse, is transmitted using a predefined maximum transmission power level (e.g., associated with a predefined maximum signal amplitude). In some embodiments, a respective transmitted signal pulse is transmitted using a transmission power level that is at least a predefined threshold power level with respect to a predefined maximum transmission power level (e.g., of a transmitter). For example, a respective transmitted signal pulse is transmitted using a transmission power level that is at least 80%, 90%, or 95%, etc. of the predefined maximum transmission power level of a transmitter. In some embodiments, any respective transmitted signal pulse representing any respective symbol in the first predefined set of frequency bands can be transmitted using the predefined maximum transmission power level, or using a transmission power level that is at least the predefined threshold power level with respect to the predefined maximum transmission power level, thereby improving the signal-to-noise ratio of transmitted signals.

In some embodiments, the system determines (620) a first pulse duration based on the first symbol of the two or more symbols (e.g., described with respect to step 604). In some embodiments, a pulse duration of the first signal pulse corresponds to the first pulse duration.

In some embodiments, the system obtains (624) a second symbol, in the predefined set of symbols, for transmission. In some embodiments, the system determines a second frequency band, in the first predefined set of frequency bands, associated with the second symbol. In some embodiments, after at least a predefined amount of time since transmitting the first signal pulse, the system transmits a second signal pulse having a second frequency in the second frequency band (e.g., a nominal frequency, such as a center frequency, in the second frequency band). In some embodiments, the predefined amount of time is measured from the time that (transmission of) the first signal pulse ends. In some embodiments, the predefined amount of time is measured from the time that transmission of the first signal pulse was initiated, and the predefined amount of time is longer than the duration of the first signal pulse, such that transmission of the second signal pulse begins after an amount of time after transmission of the first signal pulse ends.

In some embodiments, after transmitting the first signal pulse, the system transmits (626) (e.g., via a control channel, using a predefined control frequency band (known also to a receiver)) a control signal associating a second predefined set of frequency bands with the predefined set of symbols. In some embodiments, the second predefined set of frequency bands is distinct from the first predefined set of frequency bands. In some embodiments, each frequency band in the second predefined set of frequency bands is associated with a distinct respective symbol in the predefined set of symbols. In some embodiments, at least one symbol in the predefined set of symbols is assigned to a frequency band in the second predefined set of frequency bands that is different from the frequency band in the first predefined set of frequency bands to which the symbol was assigned. In some embodiments, frequency bands in the second predefined set of frequency bands, in aggregate, are not contiguous.

In some embodiments, after transmitting the control signal, the system obtains (628) a third symbol, in the predefined set of symbols, for transmission. In some embodiments, the system determines a third frequency band, in the second predefined set of frequency bands, associated with the third symbol. In some embodiments, the system transmits a third signal pulse having a third frequency in the third frequency band.

In some embodiments, prior to transmitting the control signal associating the second predefined set of frequency bands with the predefined set of symbols, the system determines (630) that a spectral density (e.g., a power spectral density) of a respective frequency band in the first predefined set of frequency bands satisfies (e.g., meets or exceeds) a predefined threshold value. In some embodiments, the system identifies, from the predefined set of symbols, a respective symbol that is associated with the respective frequency band (whose spectral density satisfies the predefined threshold value) in the first predefined set of frequency bands. In some embodiments, the system determines that a spectral density of a fourth frequency band, outside of the first predefined set of frequency bands, is below the predefined threshold value (e.g., a different frequency band that is not currently one of the predefined set of frequency bands, and thus not already being used for a respective symbol). In some embodiments, the second predefined set of frequency bands includes the fourth frequency band, and the respective symbol in the predefined set of symbols (that was associated with the respective frequency band in the first predefined set of frequency bands whose spectral density satisfies the predefined threshold value) is associated with the fourth frequency band in the second predefined set of frequency bands. Stated another way, in some embodiments, a particular band in the first predefined set of frequency bands may be determined to have a spectral density that is too high. In some embodiments, spectral density above a predefined threshold value indicates that the particular frequency band is "noisy" and/or that too many other signals are being transmitted using the associated frequency band. Accordingly, in some embodiments, a new frequency band with sufficiently low spectral density (e.g., a "quieter" frequency band) is identified as a potential replacement for the noisy frequency band. In some embodiments, the symbol-to-frequency assignments are modified so that the symbol represented by the noisy frequency band is instead represented by the new quieter frequency band. In some embodiments, a transmitting system communicates the modified assignments (e.g., using the second predefined set of frequency bands) to a receiving system and then proceeds to transmit information using the modified assignments.

It should be understood that the particular order in which the operations in method 600 have been described is merely an example and is not intended to indicate that the described order is the only order in which the operations could be performed. One of ordinary skill in the art would recognize various ways to re-order the operations described herein. Additionally, it should be noted that details of other processes described herein with respect to other methods described herein (e.g., method 500) are also applicable in an analogous manner to method 600 described above with respect to FIGS. 6A-6B. For example, the signal pulses, symbols, units of data, frequencies, and frequency bands described above with reference to method 600 optionally have one or more of the characteristics of the signal pulses, symbols, units of data, frequencies, and frequency bands described herein with reference to other methods described herein (e.g., method 500). For brevity, these details are not repeated here.

The foregoing description, for purpose of explanation, has been described with reference to specific embodiments. However, the illustrative discussions above are offered by way of example only, and are not intended to be exhaustive or to limit the invention to the precise forms disclosed. Many modifications and variations are possible in view of the above teachings without departing from their spirit and scope, as will be apparent to those skilled in the art. The embodiments were chosen and described in order to best explain the principles of the invention and its practical applications, to thereby enable others skilled in the art to best use the invention and various embodiments with various modifications as are suited to the particular use contemplated.

What is claimed is:

1. A method of receiving information, comprising:
    receiving a first signal pulse;
    determining a first frequency band associated with the first signal pulse;
    determining a first pulse duration of the first signal pulse;
    in accordance with a determination that the first frequency band is a first respective frequency band in a first predefined set of frequency bands:
        determining, from a first predefined set of symbols, a first symbol associated with the first frequency band and represented by the first signal pulse; and
        after determining the first symbol associated with the first frequency band and represented by the first signal pulse, providing the first symbol; and
    in accordance with a determination that the first pulse duration is a first respective pulse duration in a first predefined set of pulse durations:
        determining, from a second predefined set of symbols that is distinct from the first predefined set of symbols, a second symbol associated with the first pulse duration and represented by the first signal pulse; and
        after determining the second symbol associated with the first pulse duration and represented by the first signal pulse, providing the second symbol;
    wherein:
        each frequency band in the first predefined set of frequency bands is associated with a distinct respective symbol in the first predefined set of symbols; and
        each pulse duration in the first predefined set of pulse durations is associated with a distinct respective symbol in the second predefined set of symbols.

2. The method of claim 1, wherein each symbol in the first predefined set of symbols is associated with only one respective frequency band in the first predefined set of frequency bands, and each symbol in the second predefined set of symbols is associated with only one respective pulse duration in the first predefined set of pulse durations.

3. The method of claim 1, including:
    after at least a predefined amount of time since receiving the first signal pulse, receiving a second signal pulse;
    determining a second frequency band associated with the second signal pulse, wherein the second frequency band is the same as the first frequency band;
    determining a second pulse duration of the second signal pulse, wherein the second pulse duration is distinct from the first pulse duration; and
    in accordance with a determination that the second frequency band is the first respective frequency band in the first predefined set of frequency bands:
        providing the first symbol; and
    in accordance with a determination that the second pulse duration is a second respective pulse duration in the first predefined set of pulse durations:
        determining, from the second predefined set of symbols, a third symbol associated with the second pulse duration and represented by the second signal pulse, wherein the third symbol is distinct from the second symbol; and
        providing the third symbol.

4. The method of claim 1, including:
    after at least a predefined amount of time since receiving the first signal pulse, receiving a third signal pulse;
    determining a third frequency band associated with the third signal pulse, wherein the third frequency band is distinct from the first frequency band;
    determining a third pulse duration of the third signal pulse, wherein the third pulse duration is the same as the first pulse duration; and
    in accordance with a determination that the third frequency band is a second respective frequency band in the first predefined set of frequency bands:
        determining, from the first predefined set of symbols, a fourth symbol associated with the third frequency band and represented by the third signal pulse, wherein the fourth symbol is distinct from the first symbol; and
        providing the fourth symbol; and
    in accordance with a determination that the third pulse duration is the first respective pulse duration in the first predefined set of pulse durations:
        providing the second symbol.

5. The method of claim 1, wherein the frequency bands in the first predefined set of frequency bands, in aggregate, are not contiguous.

6. The method of claim 1, wherein:
    the first predefined set of frequency bands and the first predefined set of pulse durations are associated with the first predefined set of symbols and the second predefined set of symbols using one or more lookup tables;
determining the first symbol associated with the first frequency band includes:
selecting the respective symbol in the first predefined set of symbols that is associated with the first frequency band in the one or more lookup tables; and
determining the second symbol associated with the first pulse duration includes:
selecting the respective symbol in the second predefined set of symbols that is associated with the first pulse duration in the one or more lookup tables.

7. The method of claim 1, including, after receiving the first signal pulse:
receiving a control signal associating a second predefined set of frequency bands with the first predefined set of symbols, wherein:
the second predefined set of frequency bands is distinct from the first predefined set of frequency bands; and
each frequency band in the second predefined set of frequency bands is associated with a distinct respective symbol in the first predefined set of symbols;
after receiving the control signal, receiving a fourth signal pulse;
determining a fourth frequency band associated with the fourth signal pulse;
determining a fourth pulse duration of the fourth signal pulse;
in accordance with a determination that the fourth frequency band is a respective frequency band in the second predefined set of frequency bands:
determining, from the first predefined set of symbols, a respective symbol associated with the fourth frequency band and represented by the fourth signal pulse; and
providing the respective symbol from the first predefined set of symbols; and
in accordance with a determination that the fourth pulse duration is a respective pulse duration in the first predefined set of pulse durations:
determining, from the second predefined set of symbols, a respective symbol associated with the fourth pulse duration and represented by the fourth signal pulse; and
providing the respective symbol from the second predefined set of symbols.

8. A system for information transfer, comprising:
a receiver, configured to receive a first signal pulse;
frequency determination circuitry, configured to determine a first frequency band associated with the first signal pulse;
pulse duration determination circuitry, configured to determine a first pulse duration of the first signal pulse; and
processing circuitry, configured to:
in accordance with a determination that the first frequency band is a first respective frequency band in a first predefined set of frequency bands:
determine, from a first predefined set of symbols, a first symbol associated with the first frequency band and represented by the first signal pulse; and
after determining the first symbol associated with the first frequency band and represented by the first signal pulse, provide the first symbol; and
in accordance with a determination that the first pulse duration is a first respective pulse duration in a first predefined set of pulse durations:
determine, from a second predefined set of symbols that is distinct from the first predefined set of symbols, a second symbol associated with the first pulse duration and represented by the first signal pulse; and
after determining the second symbol associated with the first pulse duration and represented by the first signal pulse, provide the second symbol;
wherein:
each frequency band in the first predefined set of frequency bands is associated with a distinct respective symbol in the first predefined set of symbols; and
each pulse duration in the first predefined set of pulse durations is associated with a distinct respective symbol in the second predefined set of symbols.

9. The system of claim 8, wherein:
the receiver is configured to, after at least a predefined amount of time since receiving the first signal pulse, receive a second signal pulse;
the frequency determination circuitry is configured to determine a second frequency band associated with the second signal pulse, wherein the second frequency band is the same as the first frequency band;
the pulse duration determination circuitry is configured to determine a second pulse duration of the second signal pulse, wherein the second pulse duration is distinct from the first pulse duration; and
the processing circuitry is configured to:
in accordance with a determination that the second frequency band is the first respective frequency band in the first predefined set of frequency bands:
provide the first symbol; and
in accordance with a determination that the second pulse duration is a second respective pulse duration in the first predefined set of pulse durations:
determine, from the second predefined set of symbols, a third symbol associated with the second pulse duration and represented by the second signal pulse, wherein the third symbol is distinct from the second symbol; and
provide the third symbol.

10. The system of claim 8, wherein:
the receiver is configured to, after at least a predefined amount of time since receiving the first signal pulse, receive a third signal pulse;
the frequency determination circuitry is configured to determine a third frequency band associated with the third signal pulse, wherein the third frequency band is distinct from the first frequency band;
the pulse duration determination circuitry is configured to determine a third pulse duration of the third signal pulse, wherein the third pulse duration is the same as the first pulse duration; and
the processing circuitry is configured to:
in accordance with a determination that the third frequency band is a second respective frequency band in the first predefined set of frequency bands:
determine, from the first predefined set of symbols, a fourth symbol associated with the third frequency band and represented by the third signal pulse, wherein the fourth symbol is distinct from the first symbol; and
provide the fourth symbol; and
in accordance with a determination that the third pulse duration is the first respective pulse duration in the first predefined set of pulse durations:
provide the second symbol.

11. The system of claim 8, wherein the frequency bands in the first predefined set of frequency bands, in aggregate, are not contiguous.

12. A method of transmitting information, comprising:
obtaining a first symbol, in a first predefined set of symbols, for transmission;
obtaining a second symbol, in a second predefined set of symbols, for transmission;
determining a first frequency band, in a first predefined set of frequency bands, associated with the first symbol;
determining a first pulse duration, in a first predefined set of pulse durations, associated with the second symbol;
transmitting a first signal pulse having the first pulse duration and having a first frequency in the first frequency band, wherein the first signal pulse represents the first symbol and the second symbol;
obtaining a third symbol, in the first predefined set of symbols, for transmission, wherein the third symbol is the same as the first symbol;
obtaining a fourth symbol, in the second predefined set of symbols, for transmission, wherein the fourth symbol is distinct from the second symbol;
determining a second frequency band, in the first predefined set of frequency bands, associated with the third symbol, wherein the second frequency band is the same as the first frequency band;
determining a second pulse duration, in the first predefined set of pulse durations, associated with the fourth symbol, wherein the second pulse duration is distinct from the first pulse duration; and
after at least a predefined amount of time since transmitting the first signal pulse, transmitting a second signal pulse having the second pulse duration and having a respective frequency in the first frequency band;
wherein:
each frequency band in the first predefined set of frequency bands is associated with a distinct respective symbol in the first predefined set of symbols; and
each pulse duration in the first predefined set of pulse durations is associated with a distinct respective symbol in the second predefined set of symbols.

13. The method of claim 12, wherein each symbol in the first predefined set of symbols is associated with only one respective frequency band in the first predefined set of frequency bands, and each symbol in the second predefined set of symbols is associated with only one respective pulse duration in the first predefined set of pulse durations.

14. The method of claim 12, further comprising:
obtaining a fifth symbol, in the first predefined set of symbols, for transmission, wherein the fifth symbol is distinct from the first symbol;
obtaining a sixth symbol, in the second predefined set of symbols, for transmission, wherein the sixth symbol is the same as the second symbol;
determining a third frequency band, in the first predefined set of frequency bands, associated with the fifth symbol, wherein the third frequency band is distinct from the first frequency band;
determining a third pulse duration, in the first predefined set of pulse durations, associated with the sixth symbol, wherein the third pulse duration is the same as the first pulse duration; and
after at least a predefined amount of time since transmitting the first signal pulse, transmitting a third signal pulse having the first pulse duration and having a respective frequency in the third frequency band.

15. The method of claim 12, wherein the frequency bands in the first predefined set of frequency bands, in aggregate, are not contiguous.

16. The method of claim 12, wherein:
the first predefined set of frequency bands and the first predefined set of pulse durations are associated with the first predefined set of symbols and the second predefined set of symbols using one or more lookup tables;
determining the first frequency band associated with the first symbol includes:
selecting the respective frequency band in the first predefined set of frequency bands that is associated with the first symbol in the one or more lookup tables; and
determining the first pulse duration associated with the second symbol includes:
selecting the respective pulse duration in the first predefined set of pulse durations that is associated with the second symbol in the one or more lookup tables.

17. The method of claim 12, including, after transmitting the first signal pulse:
transmitting a control signal associating a second predefined set of frequency bands with the first predefined set of symbols, wherein:
the second predefined set of frequency bands is distinct from the first predefined set of frequency bands; and
each frequency band in the second predefined set of frequency bands is associated with a distinct respective symbol in the first predefined set of symbols;
after transmitting the control signal:
obtaining a first respective symbol, from the first predefined set of symbols, for transmission;
obtaining a second respective symbol, from the second predefined set of symbols, for transmission;
determining a fourth frequency band, in the second predefined set of frequency bands, associated with the first respective symbol;
determining a fourth pulse duration, in the first predefined set of pulse durations, associated with the second respective symbol; and
after at least a predefined amount of time since transmitting the first signal pulse, transmitting a fourth signal pulse having the fourth pulse duration and having a respective frequency in the fourth frequency band.

18. A system for information transfer, comprising:
processing circuitry, configured to:
obtain a first symbol, in a first predefined set of symbols, for transmission;
obtain a second symbol, in a second predefined set of symbols, for transmission;
determine a first frequency band, in a first predefined set of frequency bands, associated with the first symbol;
determine a first pulse duration, in a first predefined set of pulse durations, associated with the second symbol;
obtain a third symbol, in the first predefined set of symbols, for transmission, wherein the third symbol is the same as the first symbol;
obtain a fourth symbol, in the second predefined set of symbols, for transmission, wherein the fourth symbol is distinct from the second symbol;

determine a second frequency band, in the first predefined set of frequency bands, associated with the third symbol, wherein the second frequency band is the same as the first frequency band; and determine a second pulse duration, in the first predefined set of pulse durations, associated with the fourth symbol, wherein the second pulse duration is distinct from the first pulse duration; and a transmitter, configured to:

transmit a first signal pulse having the first pulse duration and having a first frequency in the first frequency band, wherein the first signal pulse represents the first symbol and the second symbol; and after at least a predefined amount of time since transmitting the first signal pulse, transmit a second signal pulse having the second pulse duration and having a respective frequency in the first frequency band;

wherein:

each frequency band in the first predefined set of frequency bands is associated with a distinct respective symbol in the first predefined set of symbols; and each pulse duration in the first predefined set of pulse durations is associated with a distinct respective symbol in the second predefined set of symbols.

19. The system of claim 18, wherein:

the processing circuitry is configured to:

obtain a fifth symbol, in the first predefined set of symbols, for transmission, wherein the fifth symbol is distinct from the first symbol;

obtain a sixth symbol, in the second predefined set of symbols, for transmission, wherein the sixth symbol is the same as the second symbol;

determine a third frequency band, in the first predefined set of frequency bands, associated with the fifth symbol, wherein the third frequency band is distinct from the first frequency band;

determine a third pulse duration, in the first predefined set of pulse durations, associated with the sixth symbol, wherein the third pulse duration is the same as the first pulse duration; and the transmitter is configured to:

after at least a predefined amount of time since transmitting the first signal pulse, transmit a third signal pulse having the first pulse duration and having a respective frequency in the third frequency band.

20. The system of claim 18, wherein the frequency bands in the first predefined set of frequency bands, in aggregate, are not contiguous.

* * * * *